(12) United States Patent
Kim et al.

(10) Patent No.: US 7,652,738 B2
(45) Date of Patent: Jan. 26, 2010

(54) ARRAY SUBSTRATE FOR IN-PLANE SWITCHING MODE LIQUID CRYSTAL DISPLAY DEVICE AND METHOD OF MANUFACTURING THE SAME

(75) Inventors: Eui-Tae Kim, Seoul (KR); Byoung-Ho Lim, Gumi-si (KR); Hyun-Kyu Lee, Seoul (KR); Sang-Wook Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 588 days.

(21) Appl. No.: 11/643,794

(22) Filed: Dec. 22, 2006

(65) Prior Publication Data

US 2007/0153203 A1 Jul. 5, 2007

(30) Foreign Application Priority Data

Dec. 29, 2005 (KR) .................... 10-2005-0133556

(51) Int. Cl.
*G02F 1/1343* (2006.01)
*G02F 1/1333* (2006.01)

(52) U.S. Cl. ....................... 349/141; 349/43
(58) Field of Classification Search ............. 349/42–48, 349/139–143
See application file for complete search history.

(56) References Cited

U.S. PATENT DOCUMENTS

| 2007/0146605 A1* | 6/2007 | Park et al. ............... 349/141 |
| 2007/0153201 A1* | 7/2007 | Lee et al. ................ 349/141 |
| 2007/0153202 A1* | 7/2007 | Kang ...................... 349/141 |
| 2007/0153206 A1* | 7/2007 | Lim et al. ................ 349/141 |

\* cited by examiner

*Primary Examiner*—Kevin S Wood
(74) *Attorney, Agent, or Firm*—McKenna Long & Aldridge LLP

(57) ABSTRACT

An array substrate for an in-plane switching mode liquid crystal display device includes a substrate, a gate line along a first direction on the substrate, a data line along a second direction and crossing the gate line to define a pixel region, a thin film transistor connected to the gate and data lines, a pixel electrode in the pixel region and connected to the thin film transistor, and a common electrode in the pixel region and arranged in an alternating pattern with the pixel electrode, wherein each of the pixel electrode and the common electrode includes a transparent conductive pattern, and one of the pixel electrode and the common electrode further includes an opaque conductive pattern having a more narrow width than the transparent conductive pattern.

26 Claims, 21 Drawing Sheets

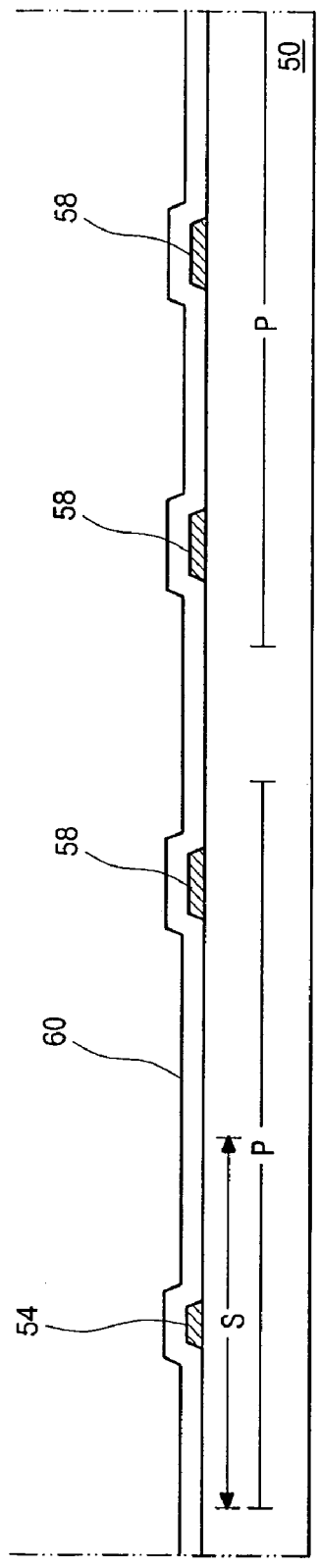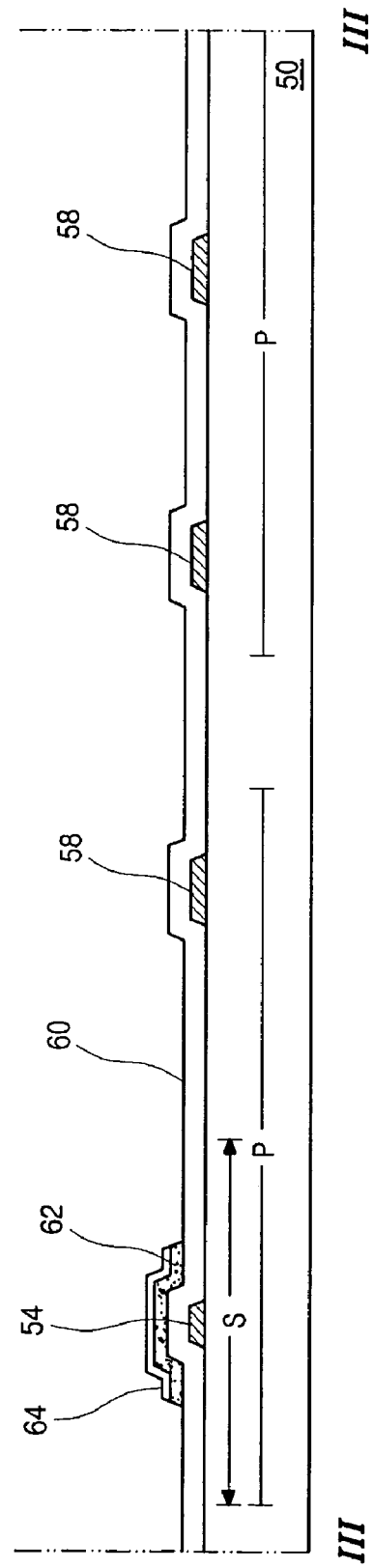
FIG. 3A
RELATED ART
FIG. 3B
RELATED ART

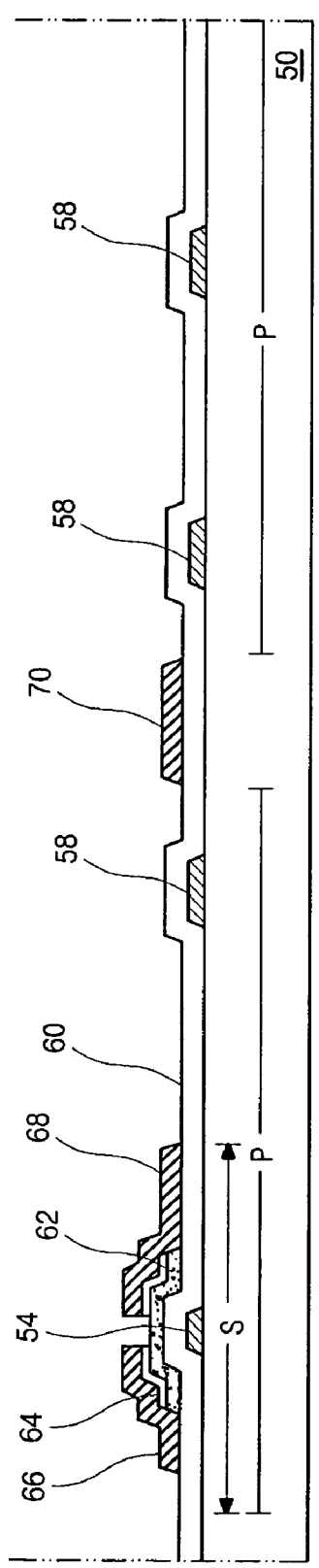
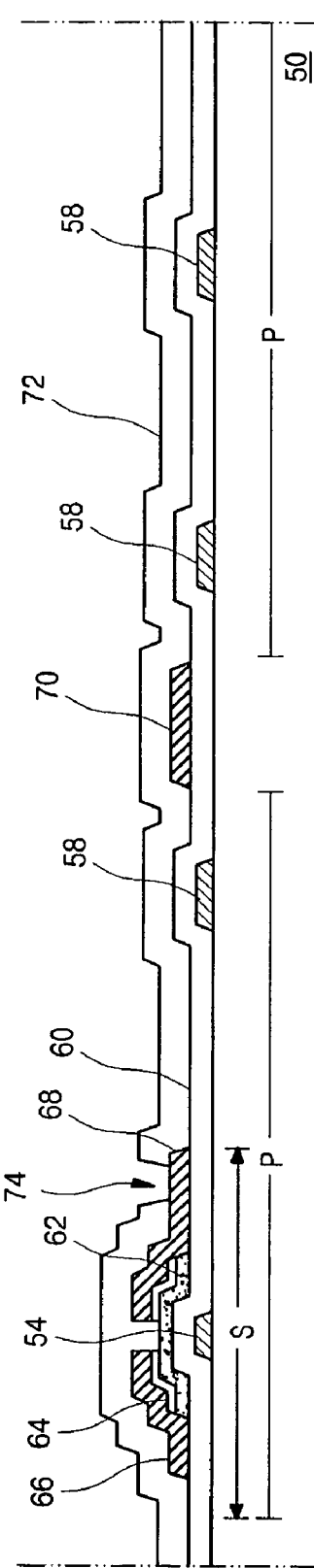
FIG. 3C
RELATED ART
FIG. 3D
RELATED ART

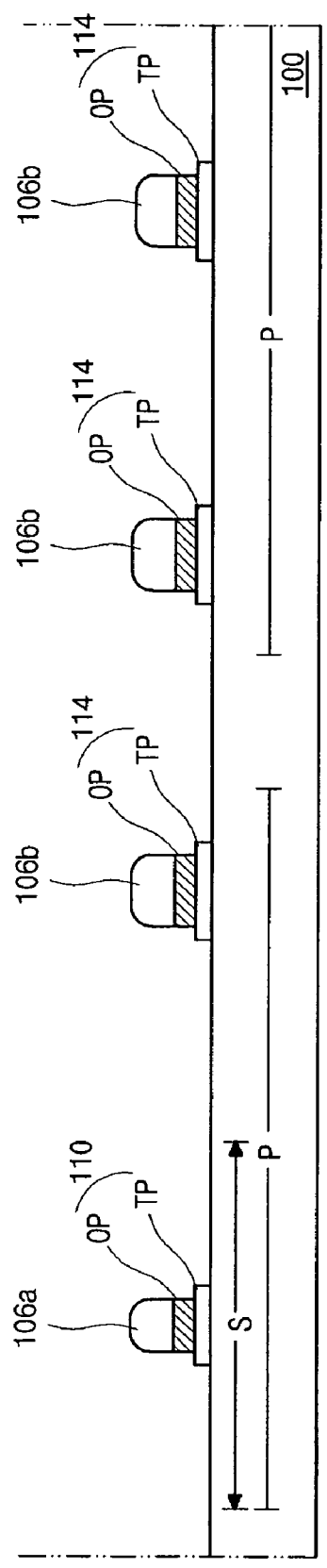
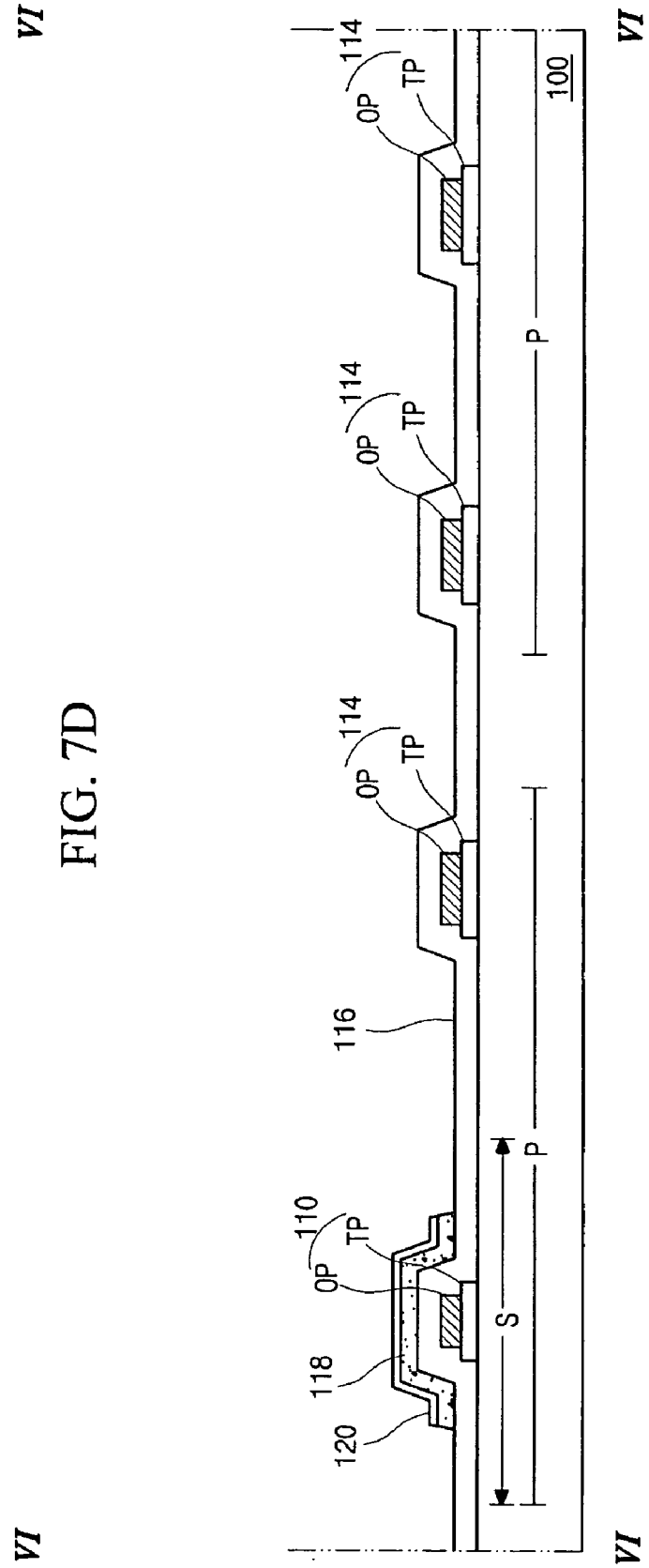
FIG. 7D
FIG. 7E

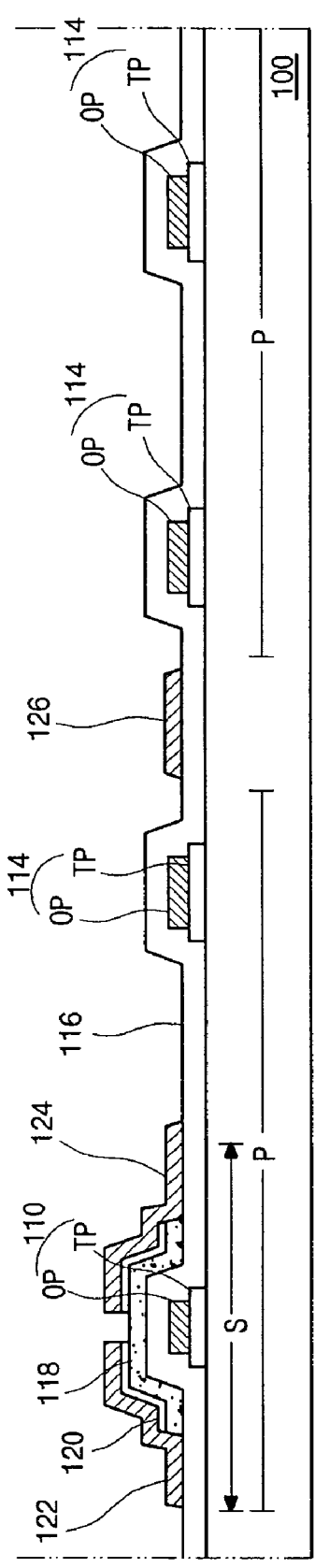
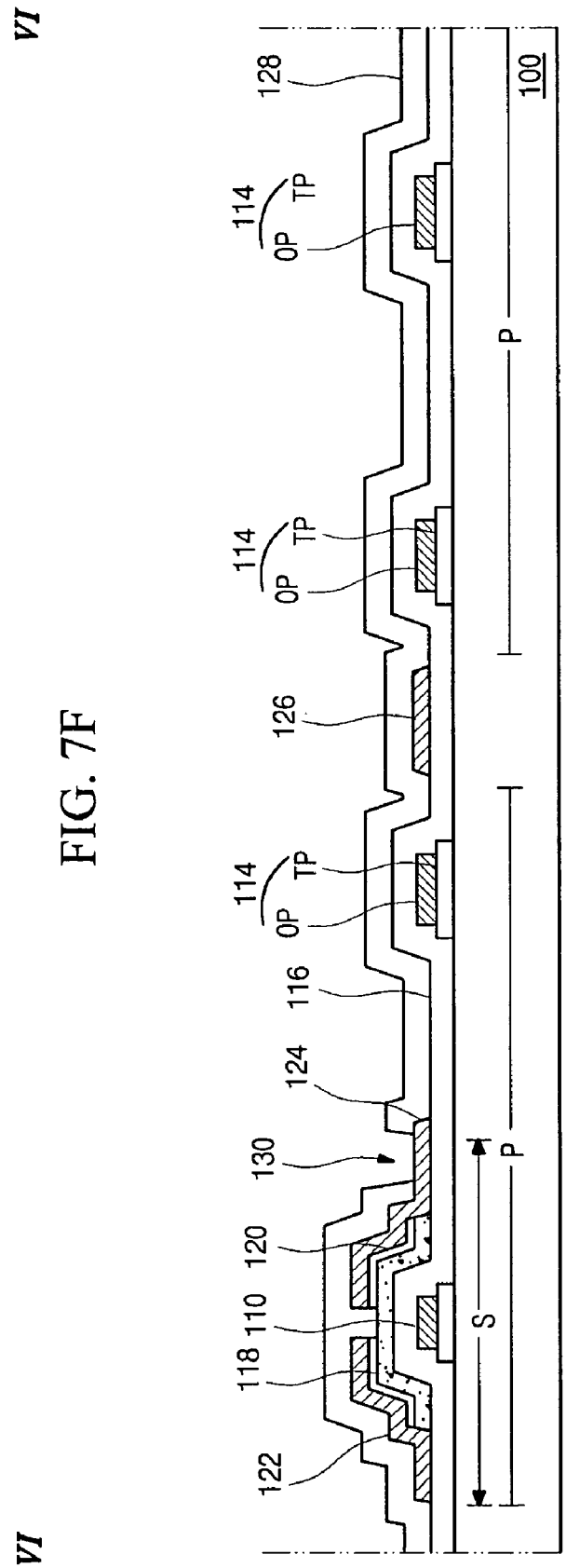
FIG. 7F
FIG. 7G

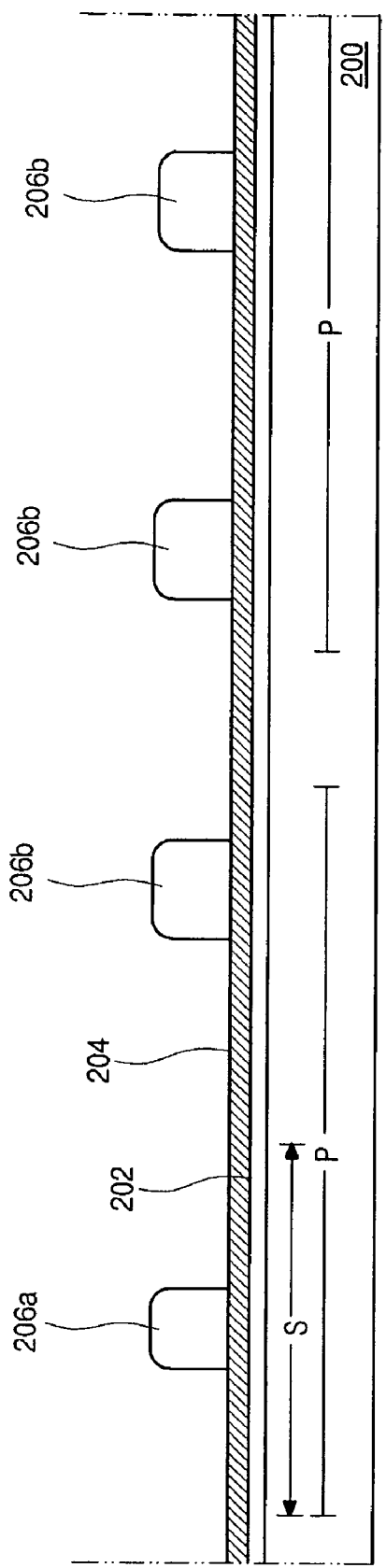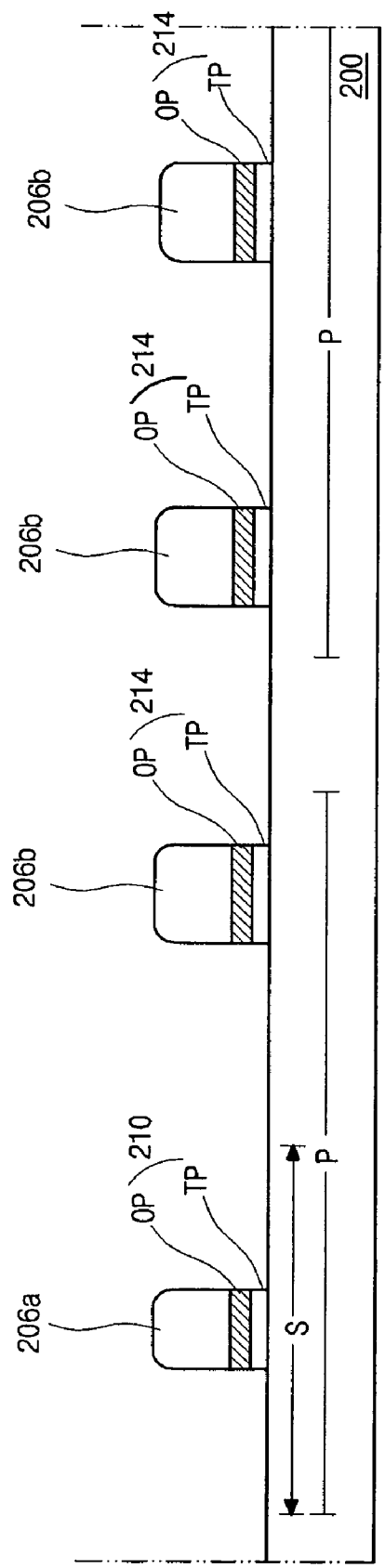

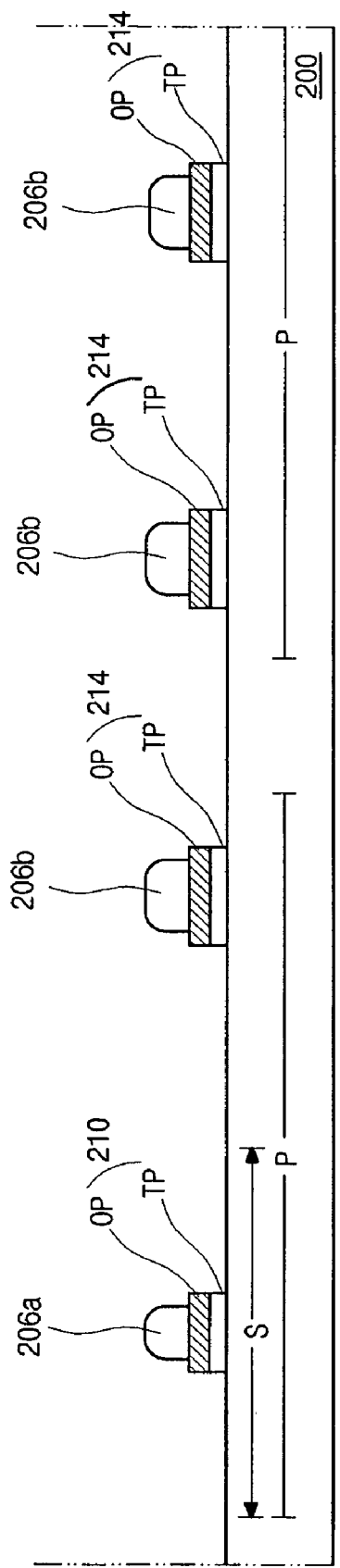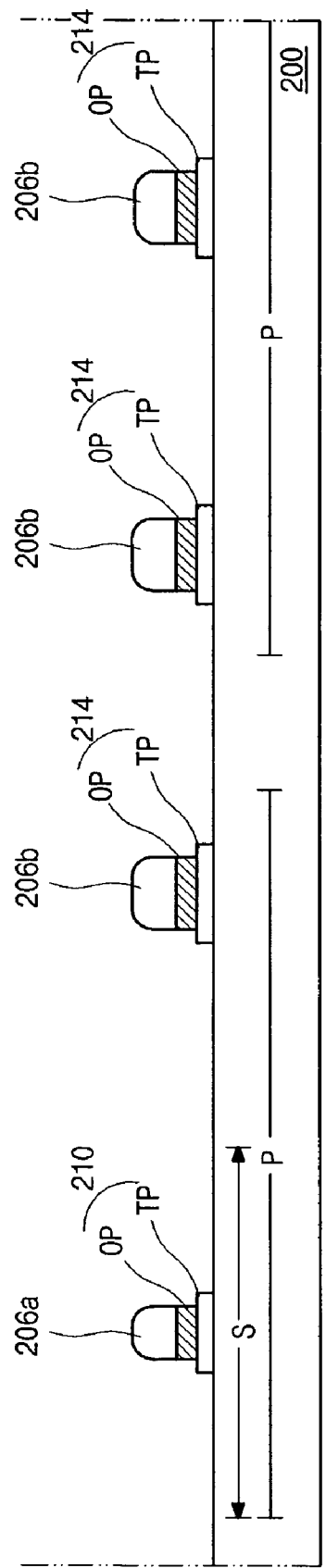

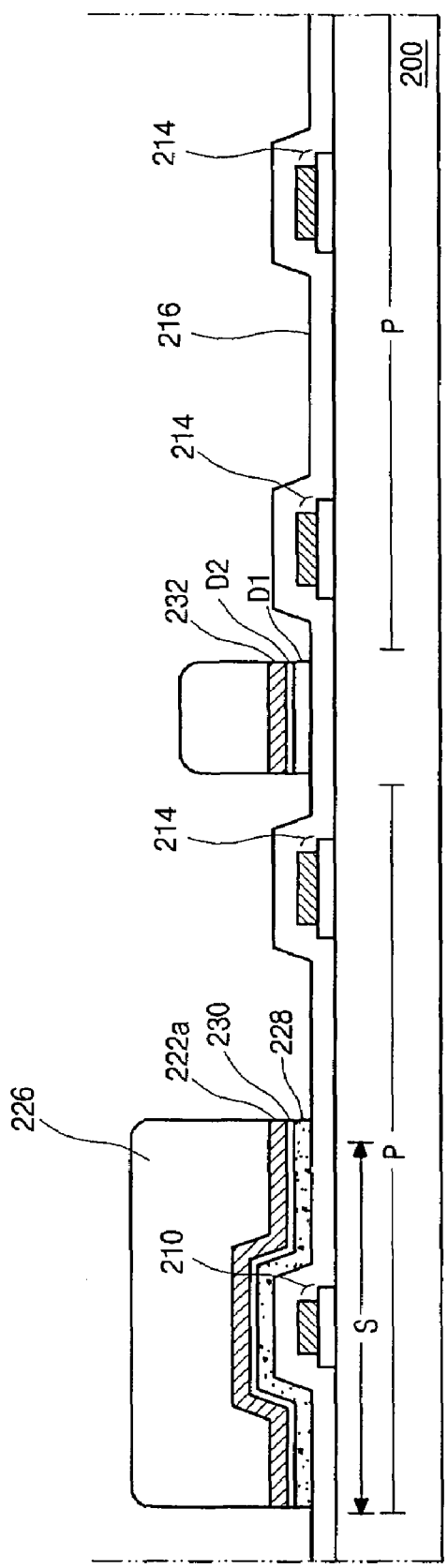
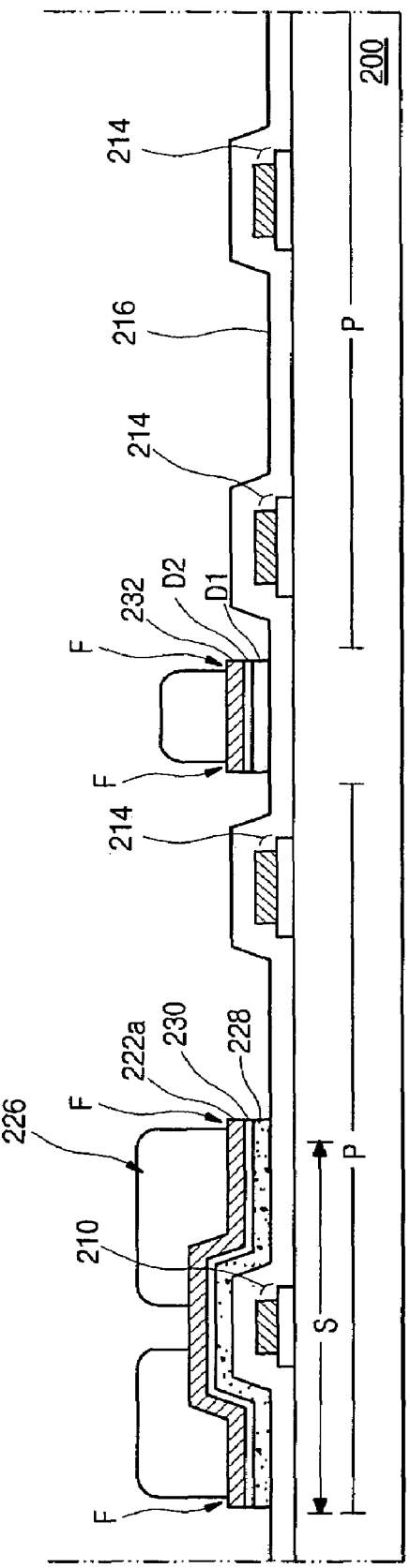

ARRAY SUBSTRATE FOR IN-PLANE SWITCHING MODE LIQUID CRYSTAL DISPLAY DEVICE AND METHOD OF MANUFACTURING THE SAME

This application claims the benefit of Korean Patent Application No. 2005-0133556, filed in Korea on Dec. 29, 2005, which is hereby incorporated by reference for all purposes as if fully set forth herein.

BACKGROUND OF THE INVENTION

1. Field of the Invention

The present invention relates to a liquid crystal display device, and more particularly, to an array substrate for an in-plane switching (IPS) mode liquid crystal display (LCD) device and a method of manufacturing the same.

2. Discussion of the Related Art

Liquid crystal display ("LCD") devices are driven based on electro-optical characteristics of a liquid crystal material. The liquid crystal material has an intermediate state between a solid crystal and an isotropic liquid. The liquid crystal material is fluid like an isotropic liquid, and molecules of the liquid crystal material are regularly arranged like a solid crystal. An alignment direction of the liquid crystal molecules depends on the intensity or the direction of an electric field applied to the liquid crystal molecules. Light passes through the LCD device along the alignment direction of the liquid crystal molecules. By controlling the intensity or the direction of the electric field, the alignment direction of the liquid crystal molecules changes, and images are displayed.

Active matrix liquid crystal display ("AMLCD") devices, which include thin film transistors as switching devices for a plurality of pixels, have been widely used due to their high resolution and ability to display fast moving images.

Generally, an LCD device includes two substrates, which are spaced apart and facing each other, and a liquid crystal layer interposed between the two substrates. Each of the substrates includes an electrode. The electrodes of the respective substrates face one the other. An electric field is induced between the electrodes by applying a voltage to each electrode. An alignment direction of liquid crystal molecules changes in accordance with a variation in the intensity or the direction of the electric field. The direction of the electric field is perpendicular to the substrates. The LCD device has relatively high transmittance and a large aperture ratio.

However, the above-described LCD device has a narrow viewing angle. To increase the viewing angles, various modes have been proposed. Among these modes, an IPS mode of the related art will be described with reference to the accompanying drawings.

FIG. 1 is a schematic cross-sectional view of an IPS mode LCD device according to the related art.

In FIG. 1, the IPS mode LCD device according to the related art includes a lower substrate 10 and an upper substrate 40, and a liquid crystal layer LC is interposed between the lower substrate 10 and the upper substrate 40.

A thin film transistor T, a common electrode 18 and a pixel electrode 30 are formed at each pixel P on the lower substrate 10. The thin film transistor T includes a gate electrode 14, a semiconductor layer 22, and source and drain electrodes 24 and 26. The semiconductor layer 22 is disposed over the gate electrode 14 with a gate insulating layer 20 therebetween. The source and drain electrodes 24 and 26 are formed on the semiconductor layer 22 and are spaced apart from each other.

The common electrode 18 includes a plurality of portions, and the pixel electrode 30 includes a plurality of parts. The portions of the common electrode 18 and the parts of the pixel electrode 30 are parallel to and spaced apart from each other on the lower substrate 10. The common electrode 18 may be formed of the same material and in the same layer as the gate electrode 14. The pixel electrode 30 may be formed of the same material and in the same layer as the source and drain electrodes 24 and 26.

Although not shown in the figure, a gate line is formed along a first side of the pixel P, and a data line is formed along a second side of the pixel P perpendicular to the first side. A common line is further formed on the lower substrate 10. The common line provides the common electrode 18 with a voltage.

A black matrix 42 and a color filter layer 44 are formed on an inner surface of the upper substrate 40. The black matrix 42 is disposed over the gate line, the data line and the thin film transistor T. The color filter layer 44 is disposed at the pixel P.

Liquid crystal molecules of the liquid crystal layer LC are driven by a horizontal electric field 35 induced between the common electrode 18 and the pixel electrodes 30.

The lower substrate 10 including the thin film transistor T, the common electrode 18 and the pixel electrode 30 may be referred to as an array substrate. The upper substrate 40 including the black matrix 42 and the color filter layer 44 may be referred to as a color filter substrate.

As stated above, the common electrode 18 is formed of the same material and on the same layer as the gate electrode 14, and the pixel electrode 30 is formed of the same material and on the same layer as the source and drain electrodes 24 and 26. Since the common electrode 18 and the pixel electrode 30 are formed of an opaque conductive material, regions for the common electrode 18 and the pixel electrode 30 are not included in an aperture area. The aperture ratio decreases, and thus the brightness is lowered.

To solve the problem, the pixel electrode has been formed of a transparent conductive material.

FIG. 2 is a plan view of an array substrate for another IPS mode LCD device according to the related art.

In FIG. 2, gate lines 52 are formed along a first direction on a substrate 50. Data lines 70 are formed along a second direction. The data lines 70 cross the gate lines 52 to define pixel regions P. A common line 56 is formed between adjacent gate lines 52 along the first direction. The common line 56 is disposed along a side of the pixel region P.

A thin film transistor T is formed at each crossing point of the gate and data lines 52 and 70. The thin film transistor T includes a gate electrode 54, an active layer 62, a source electrode 66 and a drain electrode 68. The gate electrode 54 is connected to the gate line 52. The active layer 62 is formed over the gate electrode 54 with a gate insulating layer (not shown) therebetween. The source and drain electrodes 66 and 68 are spaced apart from each other over the active layer 62. The source electrode 66 is connected to the data line 68.

A common electrode 58 and a pixel electrode 76 are formed in each pixel region P. The common electrode 58 includes portions extending from the common line 56 along the second direction, and the common electrode 58 is formed of the same material and on the same layer as the gate line 52. The pixel electrode 76 contacts the drain electrode 68 and includes parts extending along the second direction. The portions of the common electrode 58 alternate with the parts of the pixel electrode 76. The common electrode 58 is formed of an opaque conductive material, and the pixel electrode 76 is formed of a transparent conductive material.

Even though the pixel electrode is transparent, light is not transmitted all over the pixel electrode. That is, some areas of the pixel electrode under the electric field induced between the pixel electrode and the common electrode can be used for the aperture ratio. However, the brightness of the IPS mode LCD device is fairly increased on the whole when the pixel electrode is formed of a transparent conductive material.

Accordingly, in an IPS mode LCD device including the array substrate of FIG. 2, since the pixel electrode 76 is transparent, the brightness is fairly improved as compared with the IPS mode LCD device of FIG. 1.

FIGS. 3A to 3E illustrate processes of manufacturing an array substrate according to the related art. FIGS. 3A to 3E are cross-sectional views corresponding to the line III-III of FIG. 2.

FIG. 3A shows an array substrate in a first mask process. In FIG. 3, switching regions S and pixel regions P are defined on a substrate 50. Each pixel region P includes one switching region S. Gate lines 52 of FIG. 2 and gate electrodes 54 are formed on the substrate 50. Each gate electrode 54 is disposed in the switching region S and is connected to each gate line 52 of FIG. 2. A common line 56 of FIG. 2 is also formed between adjacent gate lines 52 of FIG. 2 on the substrate 50, and a common electrode 58 is formed at each pixel region P on the substrate 50. Although not shown in the figure, the gate lines 52 of FIG. 2 and the common line 56 of FIG. 2 extend along a first direction. The common electrode 58 includes portions extending from the common line 56 of FIG. 2 along a second direction crossing the first direction.

A gate insulating layer 60 is formed substantially on an entire surface of the substrate 50 including the gate lines, the gate electrode 54, the common electrode 58, and the common line by depositing one selected from an inorganic insulating material group including silicon nitride ($SiN_X$) and silicon oxide ($SiO_2$).

FIG. 3B shows an array substrate in a second mask process. In FIG. 3B, an active layer 62 and an ohmic contact layer 64 are formed on the gate insulating layer 60 over the gate electrode 54 by depositing intrinsic amorphous silicon (a-Si:H) and impurity-doped amorphous silicon (for example, n+a-Si:H) substantially on an entire surface of the substrate 50 including the gate insulating layer 60 and patterning them.

FIG. 3C shows an array substrate in a third mask process. In FIG. 3C, source and drain electrodes 66 and 68 are formed on the ohmic contact layer 64 by depositing a metallic material substantially on an entire surface of the substrate 50 including the active layer 62 and the ohmic contact layer 64 thereon and then patterning it. The source and drain electrodes 66 and 68 are spaced apart from each other. Data lines 70 are formed simultaneously with the source and drain electrodes 66 and 68. The data lines 70 are connected to respective source electrodes 66. Although not shown in the figures, the data lines 70 extend along the second direction and cross the gate lines 52 of FIG. 2 to define the pixel regions P. Each data line 70 is disposed between adjacent pixel regions P. The metallic material may be one or more selected from a conductive metallic group including aluminum (Al), an aluminum alloy such as aluminum neodymium (AlNd), chromium (Cr), tungsten (W), molybdenum (Mo), titanium (Ti) and molybdenum-tungsten (MoW).

Next, a part of the ohmic contact layer 64 is removed between the source and drain electrodes 66 and 68, thereby exposing the active layer 62.

FIG. 3D shows an array substrate in a fourth mask process. In FIG. 3D, a passivation layer 72 is formed substantially on an entire surface of the substrate 50 including the source and drain electrodes 66 and 68 by depositing one selected from an inorganic insulating material group including silicon nitride ($SiN_X$) and silicon oxide ($SiO_2$) or coating the substrate 50 with one or more selected from an organic insulating material group including benzocyclobutene (BCB) and acrylic resin. The passivation layer 72 is patterned to thereby form a drain contact hole exposing a part of each drain electrode 68.

FIG. 3E shows the array substrate in a fifth mask process. In FIG. 3E, a pixel electrode 76 is formed at each pixel region P on the passivation layer 72 by depositing a transparent conductive material substantially on an entire surface of the substrate 50 including the passivation layer 72 and then patterning it. The transparent conductive material is selected from a transparent conductive metallic group including indium tin oxide (ITO) and indium zinc oxide (IZO). The pixel electrode 76 is connected to the drain electrode 68 through the drain contact hole 64. The pixel electrode 76 includes parts spaced apart from and alternating with the portions of the common electrode 58.

The array substrate including the transparent pixel electrode 76 may be manufactured using the above-mentioned 5 mask processes. However, various trials still have been made to further improve the brightness of the LCD device. To do this, a transparent common electrode has been proposed.

FIG. 4 is a cross-sectional view of another array substrate for an IPS mode LCD device according to the related art. In FIG. 4, switching regions S and pixel regions P are defined on a substrate 50. Each pixel region P includes one switching region S. A thin film transistor T is formed in the switching region S. The thin film transistor T includes a gate electrode 54, a gate insulating layer 60, an active layer 62, an ohmic contact layer 64, a source electrode 66, and a drain electrode 68. A data line 70 is disposed between adjacent pixel regions P. The data line 70 is formed of the same material and on the same layer as the source and drain electrodes 66 and 68.

Although not shown in the figure, gate lines and a common line between adjacent gate lines are formed on the substrate 50 and cross the data line 70.

A passivation layer 72 covers the thin film transistor T and the data line 70. A pixel electrode 76 and a common electrode 78 are formed in each pixel region P on the passivation layer 72. The pixel electrode 76 contacts the drain electrode 68, and the common electrode 78 contacts the common line (not shown).

The pixel electrode 76 and the common electrode 78 are formed of a transparent conductive material. Liquid crystal molecules over edge areas E of each part of the pixel electrode 76 and each portion of the common electrode 78 are affected by an electric field induced between the pixel and common electrodes 76 and 78. The edge areas E are utilized as the aperture area.

Since the pixel electrode and the common electrode are transparent, an IPS mode LCD device including the array substrate of FIG. 4 has a more improved brightness than that of the array substrate of FIG. 2. The array substrate of FIG. 4 may be manufactured using 5 mask processes in the same way as the array substrate of FIG. 2.

However, central areas C of each part of the pixel electrode 76 and each portion of the common electrode 78 cannot be utilized as the aperture area. There may be a leakage of light in the central areas C. When the device shows black, the leakage of light may cause a disclination line. This decreases the contrast ratio of the device.

SUMMARY OF THE INVENTION

Accordingly, the present invention is directed to an in-plane switching mode liquid crystal display device that substantially obviates one or more problems due to limitations and disadvantages of the related art.

Features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

An advantage of the present invention is to provide an array substrate for an IPS mode LCD device and a method of manufacturing the same having uniform quality in displayed images and having high brightness.

In a first aspect, an array substrate for an in-plane switching mode liquid crystal display device includes a substrate, a gate line along a first direction on the substrate, a data line along a second direction and crossing the gate line to define a pixel region, a thin film transistor connected to the gate and data lines, a pixel electrode in the pixel region and connected to the thin film transistor, and a common electrode in the pixel region and arranged in an alternating pattern with the pixel electrode, wherein each of the pixel electrode and the common electrode includes a transparent conductive pattern, and one of the pixel electrode and the common electrode further includes an opaque conductive pattern having a more narrow width than the transparent conductive pattern.

In a second aspect, a method of manufacturing an array substrate for an in-plane switching mode liquid crystal display device includes forming a gate line along a first direction on a substrate, forming a data line along a second direction, the data line crossing the gate line to define a pixel region, forming a thin film transistor connected to the gate and data lines, forming a pixel electrode in the pixel region and connected to the thin film transistor, and forming a common electrode in the pixel region and alternating with the pixel electrode, wherein each of the pixel electrode and the common electrode includes a transparent conductive pattern, and one of the pixel electrode and the common electrode is formed to further include an opaque conductive pattern having a more narrow width than the transparent conductive pattern.

In a third aspect, a method of manufacturing an array substrate for an in-plane switching mode liquid crystal display device includes forming a gate line, a gate electrode and a common electrode on a substrate including a pixel region, the gate line extending along a first direction, the gate electrode connected to the gate line, the common electrode disposed in the pixel region, forming an active layer and an ohmic contact layer over the gate electrode, forming a data line, a source electrode and a drain electrode on the ohmic contact layer, the data line extending along a second direction and crossing the gate line to define the pixel region, the source electrode connected to the data line, and the drain electrode spaced apart from the source electrode, forming a passivation layer covering the data line, the source electrode and the drain electrode, the passivation layer including a contact hole exposing the drain electrode, and forming a pixel electrode in the pixel region on the passivation layer and connected to the drain electrode, the pixel electrode being arranged in an alternating pattern with the common electrode, wherein forming the pixel electrode and forming the gate line, the gate electrode and the common electrode include forming a transparent conductive pattern, and one of forming the pixel electrode and forming the gate line, the gate electrode and the common electrode is formed to further include forming an opaque conductive pattern that has a more narrow width than the transparent conductive pattern.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this specification, illustrate embodiments of the disclosure and together with the description serve to explain the principles of the disclosure. In the drawings:

FIGS. 3A to 3E are cross-sectional views illustrating an array substrate in processes of manufacturing the same according to the related art;

FIGS. 7A to 7H are cross-sectional views of an array substrate in processes of manufacturing the same according to the first embodiment;

FIGS. 9A to 9K are cross-sectional views of an array substrate in processes of manufacturing the same according to the second embodiment;

DETAILED DESCRIPTION OF THE ILLUSTRATED EMBODIMENTS

Reference will now be made in detail to the embodiments of the present disclosure, examples of which are illustrated in the accompanying drawings.

Figure 1:
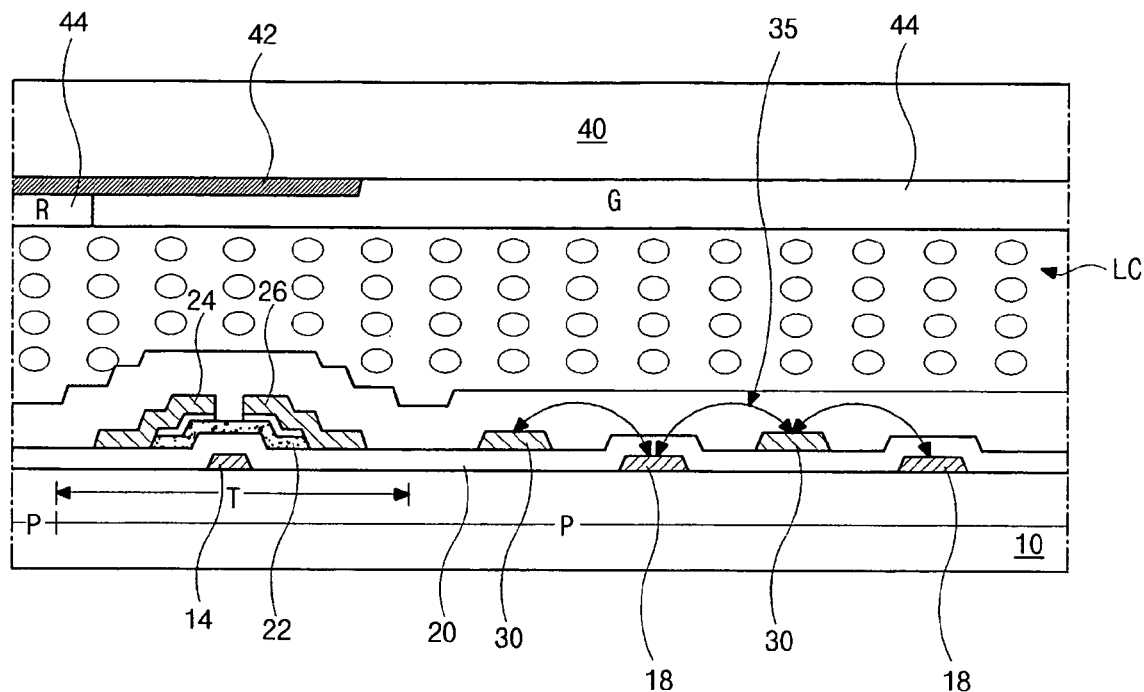
FIG. 1 is a schematic cross-sectional view of an IPS mode LCD device according to the related art.
Figure 2:
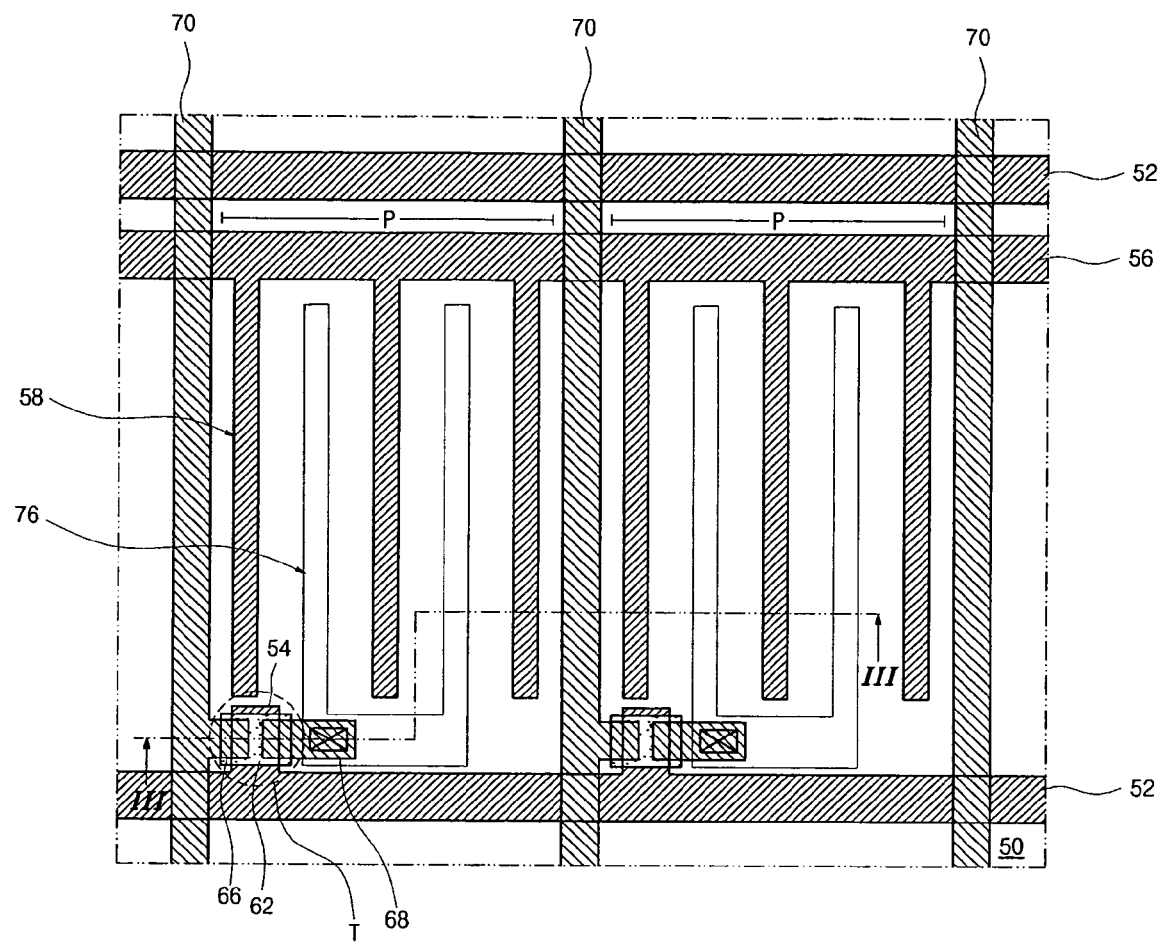
FIG. 2 is a plan view of an array substrate for another IPS mode LCD device according to the related art.
Figure 3E:
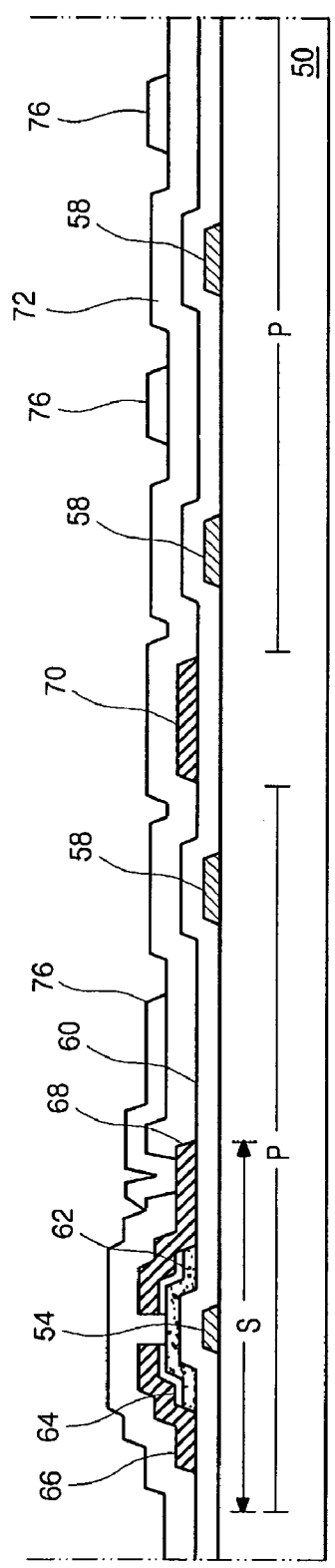
Figure 4:
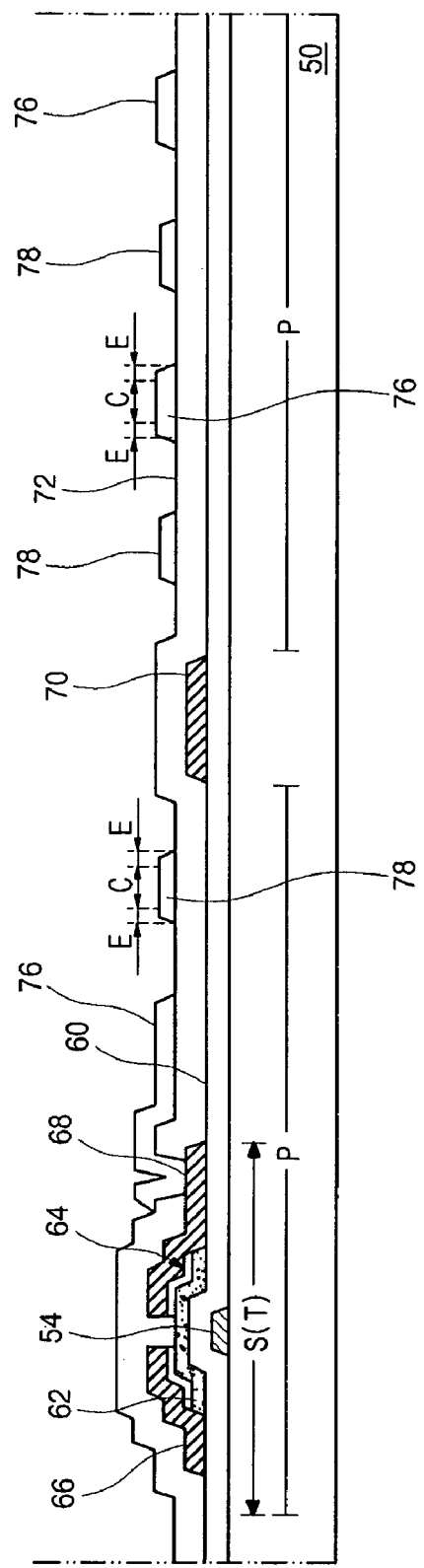
FIG. 4 is a cross-sectional view of another array substrate for an IPS mode LCD device according to the related art.
Figure 5:
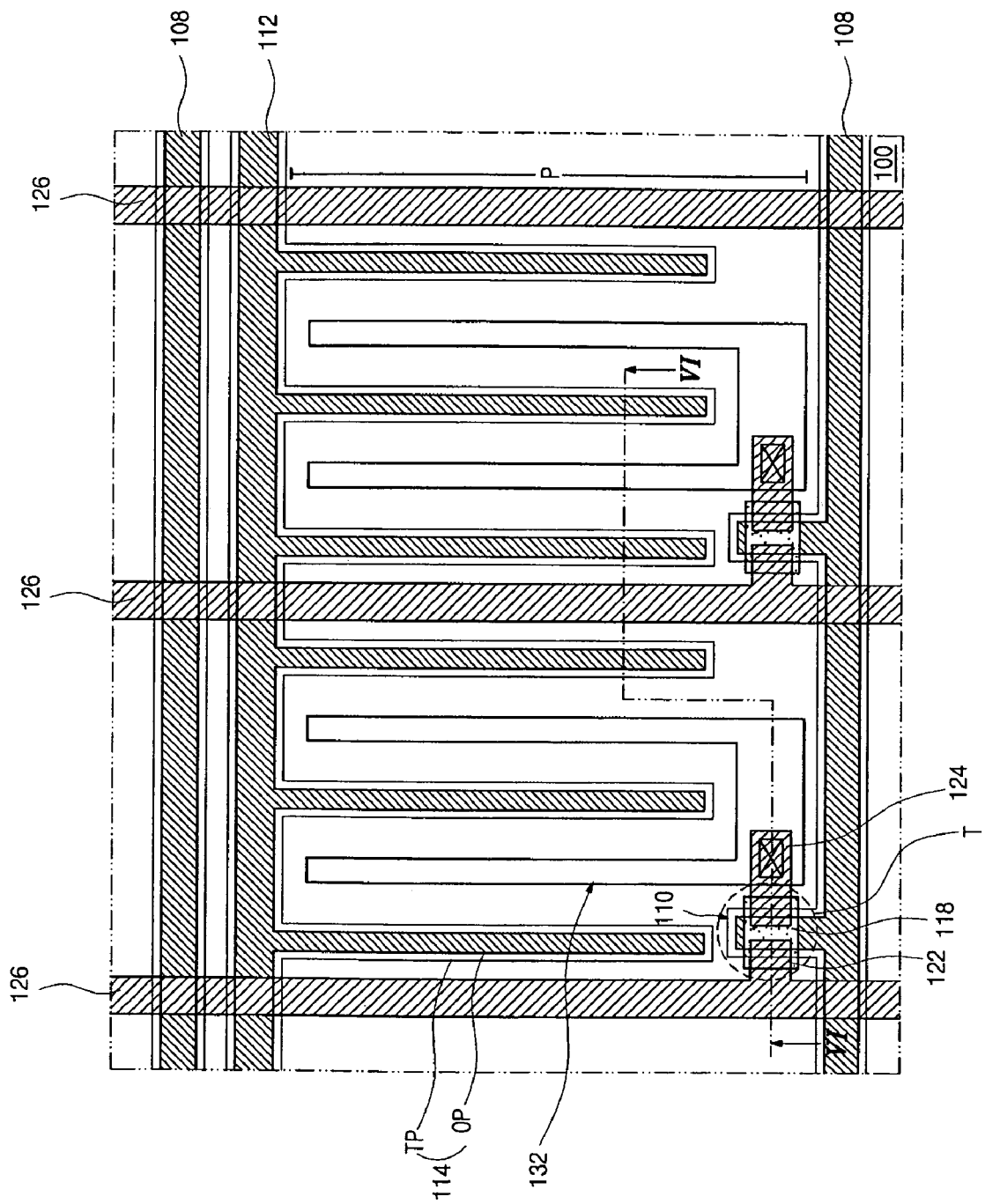
FIG. 5 is a plan view of an array substrate for an IPS mode LCD device according to a first embodiment of the present invention.

FIG. 5 is a plan view of an array substrate for an in-plane switching (IPS) mode liquid crystal display (LCD) device according to a first embodiment of the present invention.

In FIG. 5, gate lines 108 are formed along a first direction on a substrate 100, and data lines 126 are formed along a second direction crossing the first direction. The gate lines 108 and the data lines 126 cross each other to define pixel regions P. A common line 112 along the first direction is formed between adjacent gate lines 108. The common line 112 may have other shapes.

A thin film transistor T is formed at each crossing point of the gate lines 108 and the data lines 126. The thin film transistor T is connected to the gate and data lines 108 and 126. The thin film transistor T includes a gate electrode 110, an active layer 118, a source electrode 122 and a drain electrode 124. The gate electrode 110 is connected to the gate line 108.

The active layer 118 overlaps the gate line 108. The source electrode 122 is connected to the data line 126. The source and drain electrodes 122 and 124 are spaced apart from each other over the active layer 118.

A common electrode 114 and a pixel electrode 132 are formed in each pixel region P. The common electrode 114 is connected to the common line 112, and the pixel electrode 132 is connected to the drain electrode 124. The common electrode 114 includes a plurality of portions extending from the common line 112. The pixel electrode 132 is formed of a transparent conductive material. The pixel electrode 132 includes a plurality of parts contacting the drain electrode 124. The parts of the pixel electrode 132 alternate with the portions of the common electrode 114. Each portion of the common electrode 114 includes a transparent conductive pattern TP and an opaque conductive pattern OP which are sequentially layered. The opaque conductive pattern OP has a more narrow width than the transparent conductive pattern TP. A central line of the opaque conductive pattern OP is aligned with a central line of the transparent conductive pattern TP.

Figure 6:
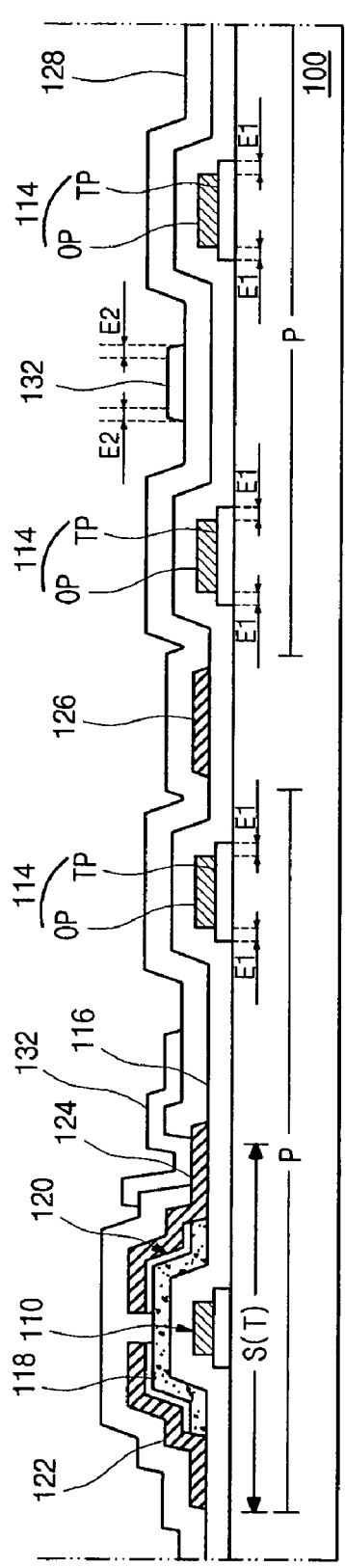
FIG. 6 is a cross-sectional view along the line VI-VI of FIG. 5.

FIG. 6 is a cross-sectional view along the line VI-VI of FIG. 5. In FIG. 6, switching regions S and pixel regions P are defined on a substrate 100. Each pixel region P includes one switching region S. A thin film transistor T is formed in the switching region S. The thin film transistor T includes a gate electrode 110, a gate insulating layer 116, an active layer 118, an ohmic contact layer 120, a source electrode 122, and a drain electrode 124. A data line 126 is disposed between adjacent pixel regions P on the gate insulating layer 116. The data line 126 is formed of the same material and on the same layer as the source and drain electrodes 122 and 124.

Although not shown in the figure, a gate line and a common line between adjacent gate lines are formed on the substrate 100 and cross the data line 126.

A common electrode 114 is formed in each pixel region P on the substrate 100. The common electrode 114 may be formed of the same material and on the same layer as the gate electrode 110. The common electrode 114 includes a plurality of portions extending from the common line (not shown). Each portion of the common electrode 114 includes a transparent conductive pattern TP and an opaque conductive pattern OP which are sequentially layered. The opaque conductive pattern OP has a more narrow width than the transparent conductive pattern TP. A central line of the opaque conductive pattern OP is aligned with a central line of the transparent conductive pattern TP. In edge areas E1 of each portion of the common electrode 114, edges of the transparent conductive pattern TP are not covered with the opaque conductive pattern OP and are exposed.

A passivation layer 128 covers the thin film transistor T and the data line 126. A pixel electrode 132 is formed in each pixel region P on the passivation layer 128. The pixel electrode 132 contacts the drain electrode 124 and includes a plurality of parts. The parts of the pixel electrode 132 alternate with the portions of the common electrode 114. The pixel electrode 132 is formed of a transparent conductive material.

In the present invention, the pixel electrode 132 and the common electrode 114 include a transparent conductive material, and thus the edge areas E1 of each portion of the common electrode 114 and edge areas E2 of each part of the pixel electrode 132 are utilized as the aperture area. As a result, the brightness of the device increases. In addition, since each portion of the common electrode 114 includes the opaque conductive pattern OP in a central area thereof, the leakage of light may be blocked. The contrast ratio is improved.

A method of manufacturing an array substrate according to the first embodiment will be described hereinafter with reference to accompanying drawings.

FIGS. 7A to 7H are cross-sectional views of an array substrate and the processes of manufacturing the same according to the first embodiment. FIGS. 7A to 7H correspond to the line VI-VI of FIG. 5.

Figure 7A:
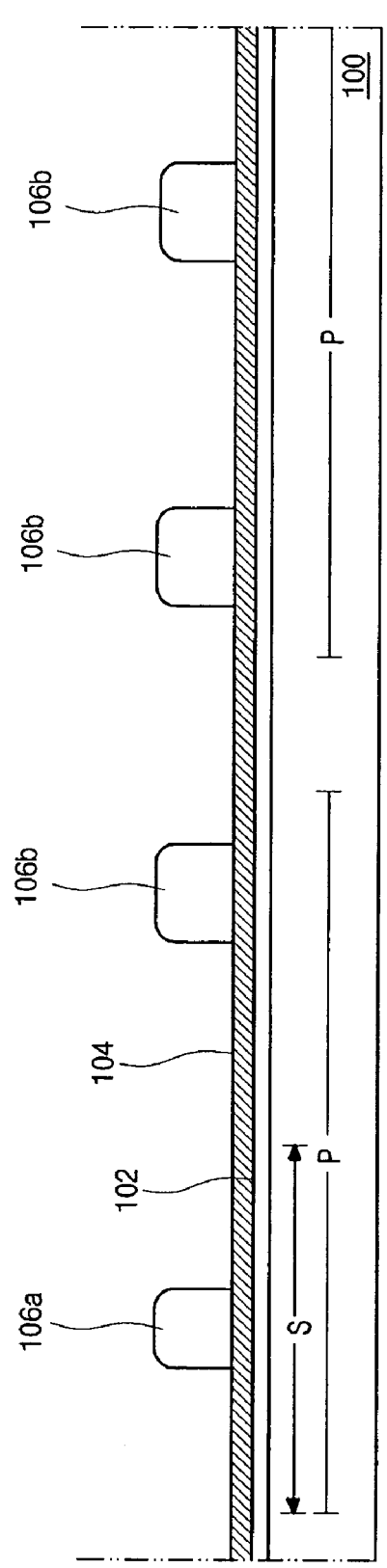

FIGS. 7A to 7D show the array substrate in a first mask process. In FIG. 7A, switching regions S and pixel regions P are defined on a substrate 100. Each pixel region P may include one switching region S. A transparent conductive layer 102 and an opaque conductive layer 104 are sequentially formed substantially on an entire surface of the substrate 100 by depositing a transparent conductive material and an opaque conductive material. The transparent conductive material may be selected from a transparent conductive metallic group including indium tin oxide (ITO) and indium zinc oxide (IZO). The opaque conductive material may be one or more selected from a conductive metallic group including aluminum (Al), an aluminum alloy such as aluminum neodymium (AlNd), chromium (Cr), tungsten (W), molybdenum (Mo), titanium (Ti) and molybdenum-tungsten (MoW).

A photoresist layer (not shown) is formed on the opaque conductive layer 104 by coating the substrate 100 with photoresist. The photoresist layer is exposed to light using a mask and then is developed, thereby forming a first photoresist pattern 106a and a second photoresist pattern 106b. The first photoresist pattern 106a is disposed in the switching region S. The second photoresist pattern 106b is disposed in the pixel region P. The second photoresist pattern 106b includes a plurality of rod-shaped portions. Although not shown in the figure, the first photoresist pattern 106a may further include a first extending portion along a first side of the pixel region P, and the second photoresist pattern 106b may further include a second extending portion substantially parallel to the first extending portion.

Figure 7B:
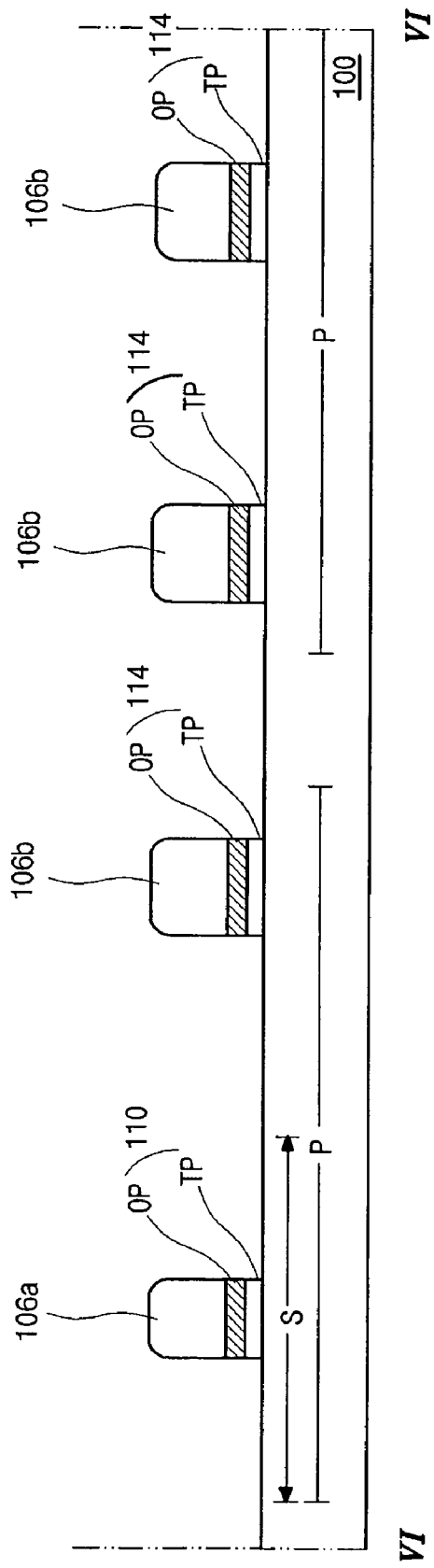

In FIG. 7B, the opaque conductive layer 104 of FIG. 7A and the transparent conductive layer 102 of FIG. 7A are removed by using the first and second photoresist patterns 106a and 106b as an etching mask to thereby form a gate electrode 110 and a common electrode 114. The gate electrode 110 is disposed under the first photoresist pattern 106a, and the common electrode 114 is disposed under the second photoresist pattern 106b. The common electrode 114 includes a plurality of portions. Each of the gate electrode 110 and the portions of the common electrode 114 includes a transparent conductive pattern TP and an opaque conductive pattern OP. The opaque conductive layer 104 of FIG. 7A and the transparent conductive layer 102 of FIG. 7A may be wet-etched by an etchant that can remove both the opaque conductive layer 104 and the transparent conductive layer 102.

Although not shown in the figure, a gate line and a common line are also formed under the first extending portion of the first photoresist pattern 106a and the second extending portion of the second photoresist pattern 106b, respectively.

Figure 7C:
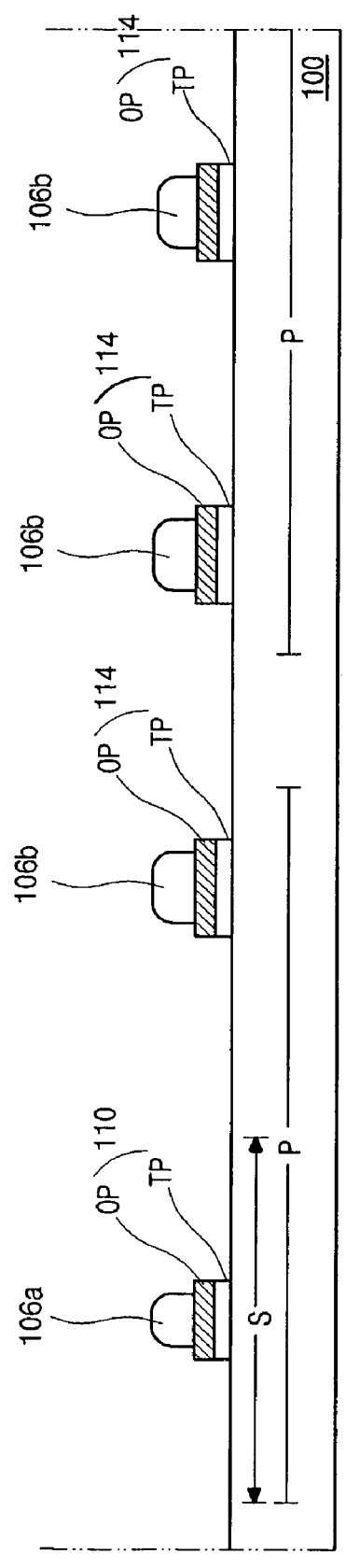

In FIG. 7C, an ashing process is performed, thereby partially removing the first photoresist pattern 106a and the second photoresist pattern 106b. Thicknesses and widths of the first and second photoresist patterns 106a and 106b are reduced, and edges of the opaque conductive patterns OP are exposed with a width of about 0.5 μm to about 2 μm.

In FIG. 7D, the exposed edges of the opaque conductive patterns OP are removed, thereby exposing edges of the transparent conductive patterns TP. The opaque conductive patterns OP may be wet-etched by an etchant that removes only the opaque conductive patterns OP.

Next, the first and second photoresist patterns 106a and 106b are removed.

The gate line, the gate electrode 110, the common line and the common electrode 114, each of which includes the transparent conductive pattern TP and the opaque conductive pattern OP, are formed through the first mask process of FIGS. 7A to 7D, wherein the opaque conductive pattern OP is disposed on the transparent conductive pattern TP and has a more narrow width than the transparent conductive pattern TP.

FIG. 7E shows the array substrate in a second mask process. In FIG. 7E, a gate insulating layer 116 is formed substantially on an entire surface of the substrate 100 including the gate line, the gate electrode 110, the common line and the common electrode 114 by depositing an inorganic insulating material. The inorganic insulating material may be selected from an inorganic insulating material group including silicon nitride ($SiN_x$) and silicon oxide ($SiO_2$). An active layer 118 and an ohmic contact layer 120 are formed on the gate insulating layer 116 over the gate electrode 110 by depositing intrinsic amorphous silicon (a-Si:H) and impurity-doped amorphous silicon (for example, n+a-Si:H) substantially on an entire surface of the substrate 100 including the gate insulating layer 116 and then patterning them through the second mask process.

FIG. 7F shows the array substrate in a third mask process. In FIG. 7F, source and drain electrodes 122 and 124 are formed on the ohmic contact layer 120 by depositing a metallic material substantially on an entire surface of the substrate 100 including the active layer 110 and the ohmic contact layer 112 and then patterning it through the third mask process. The source and drain electrodes 122 and 124 contact the ohmic contact layer 120 and are spaced apart from each other. A data line 126 is formed simultaneously with the source and drain electrodes 122 and 124. The data line 126 is disposed between adjacent pixel regions P. Although not shown in the figure, the data line 126 is connected to another source electrode. The data line 126 extends along a second side of the pixel region P and crosses the gate line to define the pixel region P.

Next, a part of the ohmic contact layer 120 is removed between the source and drain electrodes 122 and 124, thereby exposing the active layer 118.

FIG. 7G shows the array substrate in a fourth mask process. In FIG. 7G, a passivation layer 128 is formed substantially on an entire surface of the substrate 100 including the source and drain electrodes 122 and 124 and the data line 126 by depositing one selected from an inorganic insulating material group including silicon nitride ($SiN_x$) and silicon oxide ($SiO_2$) or coating the substrate 100 with one or more selected from an organic insulating material group including benzocyclobutene (BCB) and acrylic resin. The passivation layer 128 is patterned through the fourth mask process to thereby form a drain contact hole 130. The drain contact hole 130 exposes a part of the drain electrode 124.

Figure 7H:
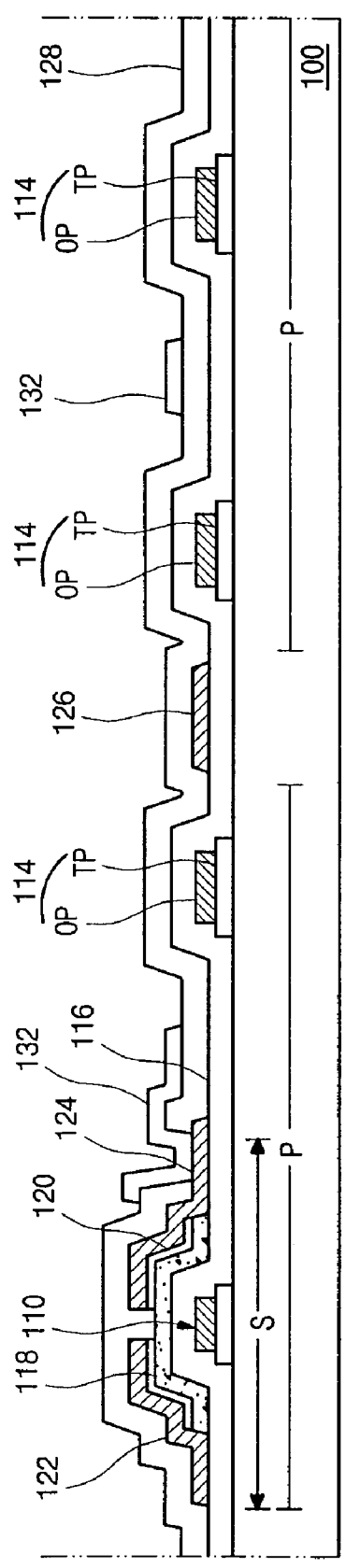

FIG. 7H shows the array substrate in a fifth mask process. In FIG. 7H, a pixel electrode 132 is formed in the pixel region P on the passivation layer 128 by depositing a transparent conductive material substantially on an entire surface of the substrate 100 including the passivation layer 128 and then patterning it through the fifth mask process. The transparent conductive material is selected from a transparent conductive metallic group including indium tin oxide (ITO) and indium zinc oxide (IZO). The pixel electrode 132 is connected to the drain electrode 124 through the drain contact hole 130. The pixel electrode 132 includes a plurality of parts arranged in an alternating pattern with the portions of the common electrode 114.

The array substrate may be manufactured through the above-mentioned five (5) mask processes according to the first embodiment of the present invention. Two layered patterns of the common electrode having different widths can be formed using one mask process, and thus the manufacturing processes are not increased and are simplified.

By decreasing the number of the manufacturing processes, the manufacturing time and costs may be lowered.

Figure 8:
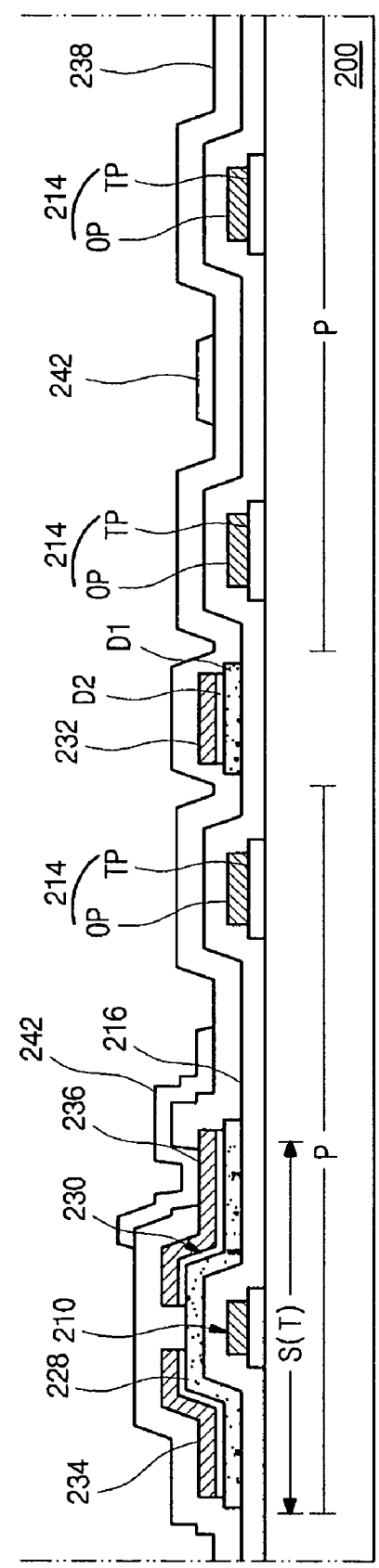
FIG. 8 is a cross-sectional view of an array substrate for an IPS mode LCD device according to a second embodiment.

FIG. 8 is a cross-sectional view of an array substrate for an IPS mode LCD device according to a second embodiment. In FIG. 8, switching regions S and pixel regions P are defined on a substrate 200. Each pixel region P includes one switching region S. A thin film transistor T is formed in the switching region S. The thin film transistor T includes a gate electrode 210, a gate insulating layer 216, an active layer 228, an ohmic contact layer 230, a source electrode 234, and a drain electrode 236. A data line 232 is disposed between adjacent pixel regions P on the gate insulating layer 216. The data line 232 is formed of the same material and on the same layer as the source and drain electrodes 234 and 236. An intrinsic amorphous silicon pattern D1 and an impurity-doped amorphous silicon pattern D2 are formed under the data line 232. Although not shown in the figure, a gate line and a common line between adjacent gate lines are formed on the substrate 200 and cross the data line 232.

A common electrode 214 is formed in each pixel region P on the substrate 200. The common electrode 214 may be formed of the same material and on the same layer as the gate electrode 210. The common electrode 214 includes a plurality of portions extending from the common line (not shown). Each portion of the common electrode 214 includes a transparent conductive pattern TP and an opaque conductive pattern OP which are sequentially layered. The opaque conductive pattern OP has a more narrow width than the transparent conductive pattern TP. A central line of the opaque conductive pattern OP is aligned with a central line of the transparent conductive pattern TP. In edge areas E1 of each portion of the common electrode 114, edges of the transparent conductive pattern TP are not covered with the opaque conductive pattern OP and are exposed.

A passivation layer 238 covers the thin film transistor T and the data line 232. A pixel electrode 242 is formed in each pixel region P on the passivation layer 238. The pixel electrode 242 contacts the drain electrode 236 and includes a plurality of parts. The parts of the pixel electrode 242 are arranged in an alternate pattern with the portions of the common electrode 214. The pixel electrode 242 is formed of a transparent conductive material.

The array substrate of FIG. 8 may be manufactured through 4 mask processes by forming the active layer 228, the ohmic contact layer 230, the source electrode 234, the drain electrode 236 and the data line 232 using one mask process.

A method of manufacturing an array substrate according to the second embodiment will be described hereinafter with reference to accompanying drawings.

FIGS. 9A to 9K are cross-sectional views of an array substrate in processes of manufacturing the same according to the second embodiment.

FIGS. 9A to 9D show the array substrate in a first mask process. In FIG. 9A, switching regions S and pixel regions P are defined on a substrate 200. Each pixel region P may include one switching region S. A transparent conductive layer 202 and an opaque conductive layer 204 are sequentially formed substantially on an entire surface of the substrate 200 by depositing a transparent conductive material and an opaque conductive material. The transparent conductive material may be selected from a transparent conductive metallic group including indium tin oxide (ITO) and indium zinc oxide (IZO). The opaque conductive material may be one or more selected from a conductive metallic group including aluminum (Al), an aluminum alloy such as aluminum neodymium (AlNd), chromium (Cr), tungsten (W), molybdenum (Mo), titanium (Ti) and molybdenum-tungsten (MoW).

A photoresist layer (not shown) is formed on the opaque conductive layer 204 by coating the substrate 200 with photoresist. The photoresist layer is exposed to light using a mask and then is developed, thereby forming a first photoresist pattern 206a and a second photoresist pattern 206b. The first photoresist pattern 206a is disposed in the switching region S. The second photoresist pattern 206b is disposed in the pixel region P. The second photoresist pattern 206b includes a plurality of rod-shaped portions. Although not shown in the figure, the first photoresist pattern 206a may further include a first extending portion along a first side of the pixel region P, and the second photoresist pattern 206b may further include a second extending portion parallel to the first extending portion.

In FIG. 9B, the opaque conductive layer 204 of FIG. 9A and the transparent conductive layer 202 of FIG. 9A are removed by using the first and second photoresist patterns 206a and 206b as an etching mask to thereby form a gate electrode 210 and a common electrode 214. The gate electrode 210 is disposed under the first photoresist pattern 206a, and the common electrode 214 is disposed under the second photoresist pattern 206b. The common electrode 214 includes a plurality of portions. Each of the gate electrode 210 and the portions of the common electrode 214 includes a transparent conductive pattern TP and an opaque conductive pattern OP. The opaque conductive layer 204 of FIG. 9A and the transparent conductive layer 202 of FIG. 9A may be wet-etched by an etchant that can remove both the opaque conductive layer 204 and the transparent conductive layer 202.

Although not shown in the figure, a gate line and a common line are also formed under the first extending portion of the first photoresist pattern 206a and the second extending portion of the second photoresist pattern 206b, respectively.

In FIG. 9C, an ashing process is performed, thereby partially removing the first photoresist pattern 206a and the second photoresist pattern 206b. Thicknesses and widths of the first and second photoresist patterns 206a and 206b are reduced, and edges of the opaque conductive patterns OP are exposed with a width of about 0.5 μm to about 2 μm.

In FIG. 9D, the exposed edges of the opaque conductive patterns OP are removed, thereby exposing edges of the transparent conductive patterns TP. The opaque conductive patterns OP may be wet-etched by an etchant that removes only the opaque conductive patterns OP.

Next, the first and second photoresist patterns 206a and 206b are removed.

The gate line, the gate electrode 210, the common line and the common electrode 214, each of which includes the transparent conductive pattern TP and the opaque conductive pattern OP, are formed through the first mask process of FIGS. 9A to 9D, wherein the opaque conductive pattern OP is disposed on the transparent conductive pattern TP and has a more narrow width than the transparent conductive pattern TP.

Figure 9E:
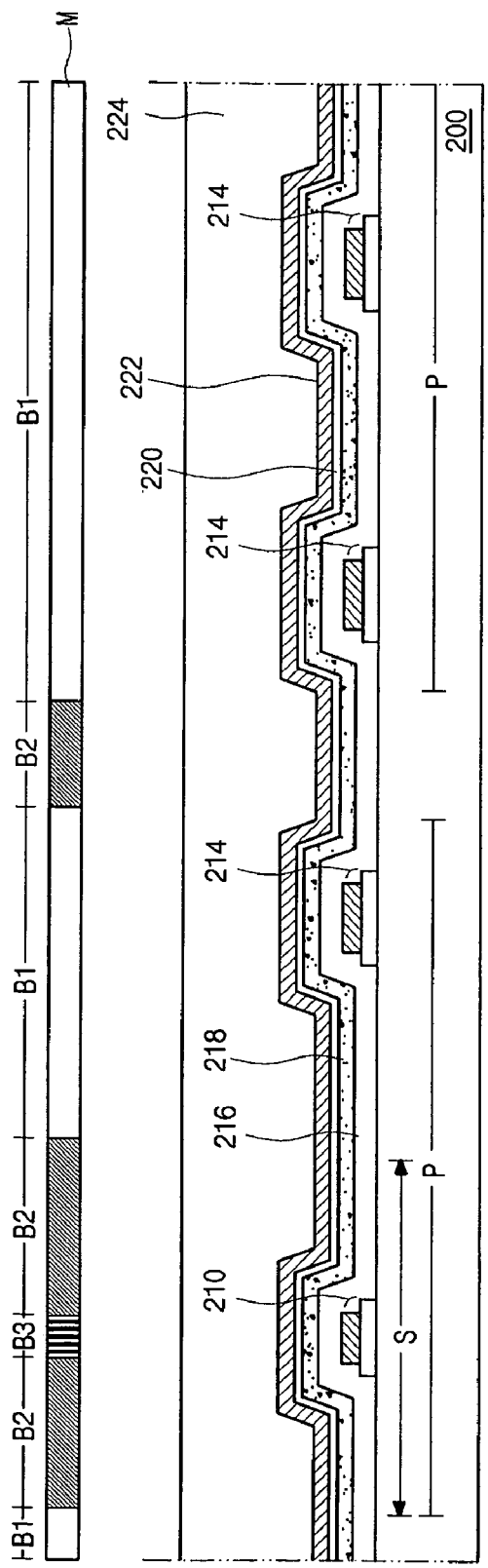

FIGS. 9E to 9I show the array substrate in a second mask process. In FIG. 9E, a gate insulating layer 216, an intrinsic amorphous silicon layer 218, an impurity-doped amorphous silicon layer 220 and a conductive metallic layer 222 are sequentially formed substantially on an entire surface of the substrate 200 including the gate line, the gate electrode 210, the common line and the common electrode 214. The gate insulating layer 216 is formed by depositing one or more selected from an inorganic insulating material group including silicon nitride ($SiN_X$) and silicon oxide ($SiO_2$). The intrinsic amorphous silicon layer 218 and the impurity-doped amorphous silicon layer 220 are formed by depositing intrinsic amorphous silicon (a-Si:H) and impurity-doped amorphous silicon (for example, n+a-Si:H). The conductive metallic layer 222 is formed by depositing one or more selected from a conductive metallic group including aluminum (Al), an aluminum alloy such as aluminum neodymium (AlNd), chromium (Cr), tungsten (W), molybdenum (Mo), titanium (Ti) and molybdenum-tungsten (MoW) as stated above.

A photoresist layer 224 is formed on the conductive metallic layer 222 by coating the substrate with photoresist. A mask M is disposed over the photoresist layer 224. The mask M includes a light-transmitting portion B1, a light-blocking portion B2 and a half-light transmitting portion B3. The light-blocking portion B2 corresponds to the switching region S except the gate electrode 210 and a region between adjacent pixel regions P. The half-light transmitting portion B3 corresponds to the switching region S for the gate electrode 210. The light-transmitting portion B1 corresponds to other regions except the switching region S and the region between adjacent pixel regions P.

The photoresist layer 224 is exposed to light through the mask M and then is developed by dipping the substrate 200 including the photoresist layer 224 exposed to the light into a developer.

Figure 9F:
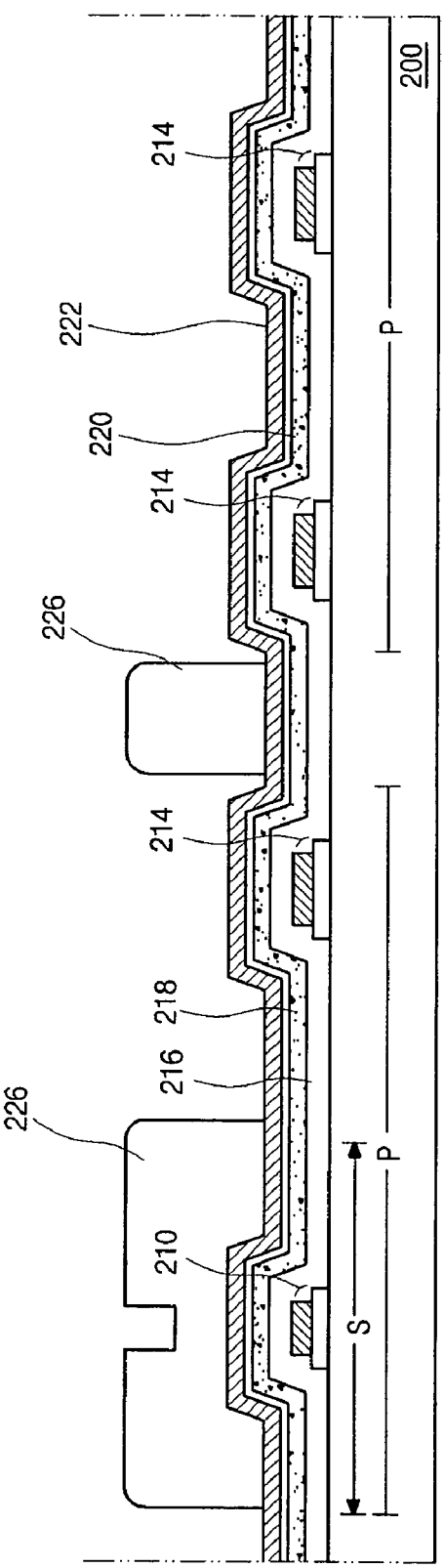

In FIG. 9F, a photoresist pattern 226 is formed after developing the photoresist layer 224, and the conductive metallic layer 222 is exposed. The photoresist pattern 226 includes a first part and a second part. The second part is disposed over the gate electrode 210 and has a thinner thickness than the first part. The first part of the photoresist pattern 226 between adjacent pixel regions P crosses the gate line (not shown).

The exposed conductive metallic layer 222, the impurity-doped amorphous silicon layer 220 and the intrinsic amorphous silicon layer 218 are removed using the photoresist pattern 226 as an etching mask. In general, the impurity-doped amorphous silicon layer 220 and the intrinsic amorphous silicon layer 218 are dry-etched. Accordingly, after the conductive metallic layer 222 may be wet-etched, the impurity-doped amorphous silicon layer 220 and the intrinsic amorphous silicon layer 218 may be dry-etched. Or, when the conductive metallic layer 222 may be formed of a metallic material that can be dry-etched, for example, molybdenum (Mo), the conductive metallic layer 222 may be dry-etched together with the impurity-doped amorphous silicon layer 220 and the intrinsic amorphous silicon layer 218.

In FIG. 9G, a metallic pattern 222a, an ohmic contact layer 230 and an active layer 228 are formed in the switching region S, and a data line 232, an impurity-doped amorphous silicon pattern D2 and an intrinsic amorphous silicon pattern D1 are formed in a region between adjacent pixel regions P.

In FIG. 9H, an ashing process is performed. The second part of the photoresist pattern 226 is removed, and the metallic pattern 222a is exposed. At this time, the first part of the photoresist pattern 226 is also partially removed. The first part of the photoresist pattern 226 has a reduced thickness and width, thereby exposing edges F of the metallic pattern 222a and the data line 232.

Figure 9I:
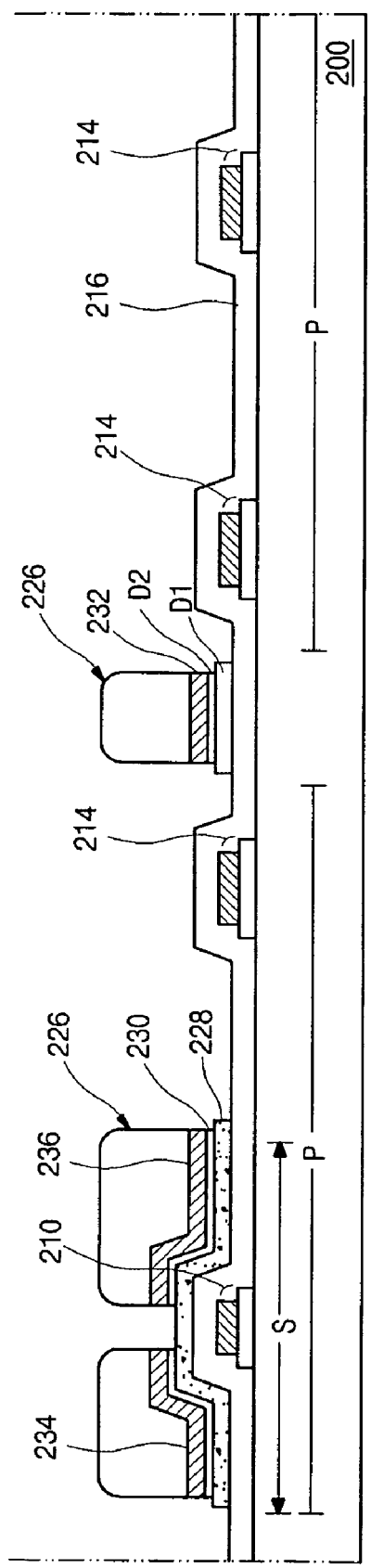

In FIG. 9I, the exposed metallic pattern 222a and the edges F of the metallic pattern 222a and the data line 232 of FIG. 9H are removed using the first part of the photoresist pattern 226 as an etching mask. A source electrode 234 and a drain electrode are formed in the switching region S, and the ohmic contact layer 230 is exposed between the source and drain electrodes 234 and 236. The source electrode 234 is connected to another data line (not shown).

The exposed ohmic contact layer 230 is removed to thereby expose the active layer 228 between the source and drain electrodes 234 and 236. The active layer 228 and the intrinsic amorphous silicon pattern D1 are also exposed around edges of the source and drain electrodes 234 and 236 and the data line 232.

In this manner, the active layer 228, the ohmic contact layer 230, the source and drain electrodes 234 and 236 and the data line 232 are formed through the second mask process.

Figure 9J:
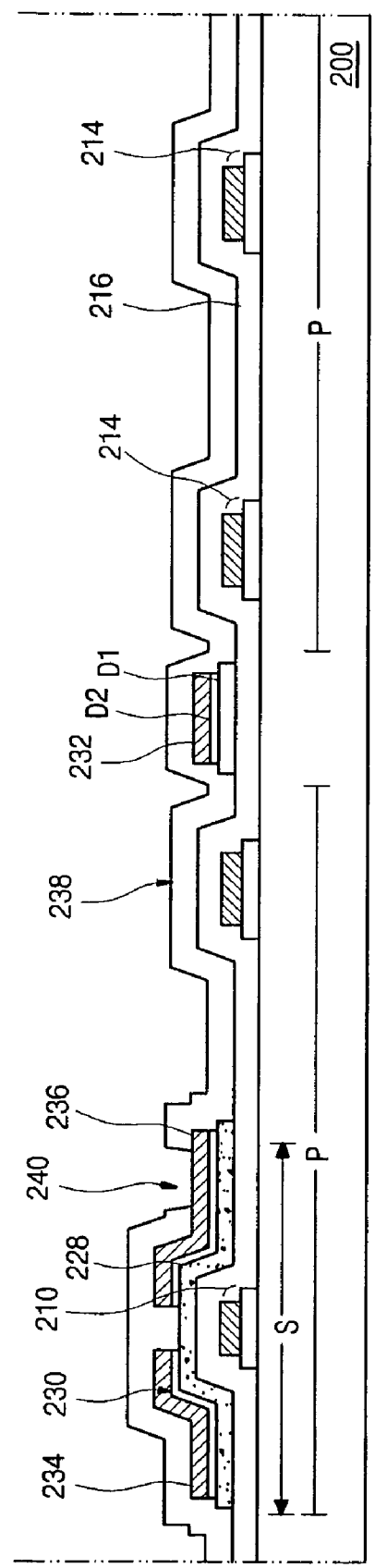

FIG. 9J shows the array substrate in a third mask process. In FIG. 9J, a passivation layer 238 is formed substantially on an entire surface of the substrate 200 including the source and drain electrodes 234 and 236 and the data line 232 by depositing one selected from an inorganic insulating material group including silicon nitride ($SiN_X$) and silicon oxide ($SiO_2$) or coating the substrate 200 with one or more selected from an organic insulating material group including benzocyclobutene (BCB) and acrylic resin. The passivation layer 238 is patterned through the third mask process to thereby form a drain contact hole 240. The drain contact hole 240 exposes a part of the drain electrode 236.

Figure 9K:
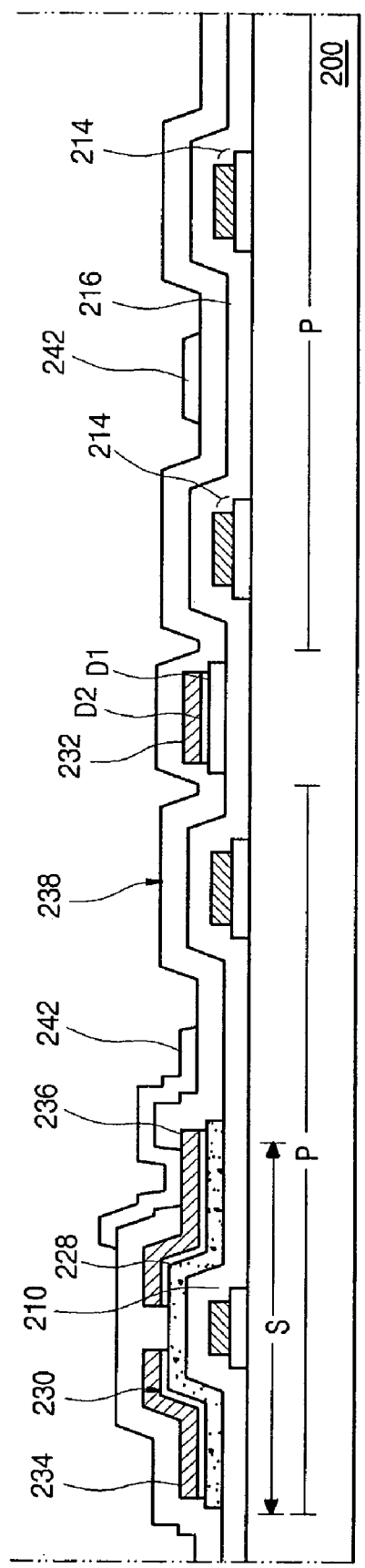

FIG. 9K shows the array substrate in a fourth mask process. In FIG. 9K, a pixel electrode 242 is formed at the pixel region P on the passivation layer 238 by depositing a transparent conductive material substantially on an entire surface of the substrate 200 including the passivation layer 238 and then patterning it through the fourth mask process. The transparent conductive material is selected from a transparent conductive metallic group including indium tin oxide (ITO) and indium zinc oxide (IZO). The pixel electrode 242 contacts the drain electrode 236. The pixel electrode 242 includes a plurality of parts alternating the portions of the common electrode 214.

The array substrate for an IPS mode LCD device may be manufactured using a four (4) mask processes as discussed above.

In the first and second embodiments, the common electrode includes the transparent conductive pattern and the opaque conductive pattern, wherein the opaque conductive pattern has a more narrow width than the transparent conductive pattern. Accordingly, the brightness is increased, and the contrast ratio is improved.

The pixel electrode also can include a transparent conductive pattern and an opaque conductive pattern.

Figure 10:
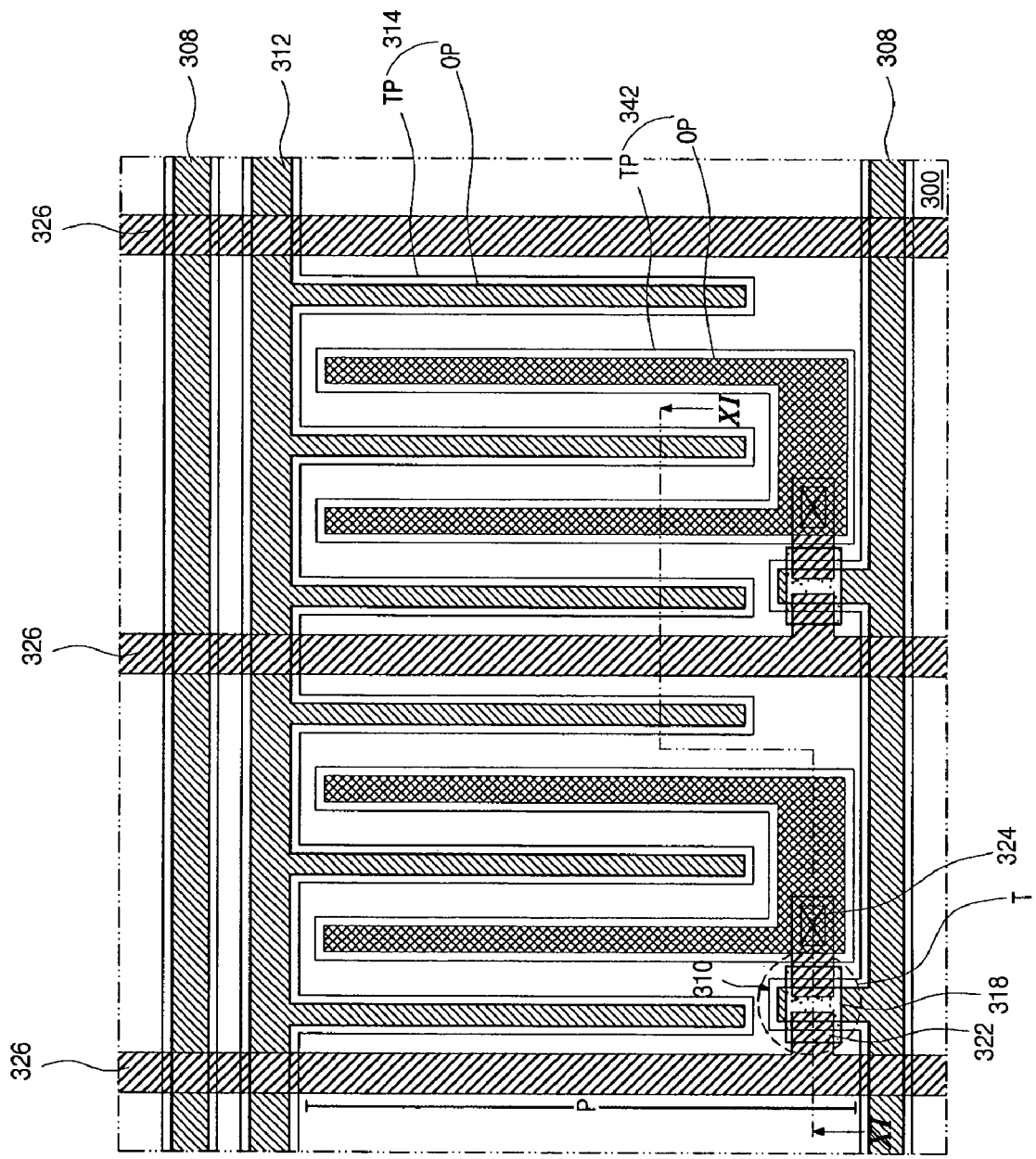
FIG. 10 is a plan view of an array substrate for an IPS mode LCD device according to a third embodiment of the present invention.

FIG. 10 is a plan view of an array substrate for an IPS mode LCD device according to a third embodiment of the present invention. In FIG. 10, gate lines 308 are formed along a first direction on a substrate 300, and data lines 326 are formed along a second direction crossing the first direction. The gate lines 308 and the data lines 326 cross each other to define pixel regions P. A common line 312 along the first direction is formed between adjacent gate lines 308. The common line 312 may have other shapes.

A thin film transistor T is formed at each crossing point of the gate lines 308 and the data lines 326. The thin film transistor T is connected to the gate and data lines 308 and 326. The thin film transistor T includes a gate electrode 310, an active layer 318, a source electrode 322 and a drain electrode 324. The gate electrode 310 is connected to the gate line 308. The active layer 318 overlaps the gate line 308. The source electrode 322 is connected to the data line 326. The source and drain electrodes 322 and 324 are spaced apart from each other over the active layer 318.

A common electrode 314 and a pixel electrode 342 are formed in each pixel region P. The common electrode 314 is connected to the common line 312, and the pixel electrode 342 is connected to the drain electrode 324. The common electrode 314 includes a plurality of portions extending from the common line 312. The pixel electrode 342 includes a plurality of parts contacting the drain electrode 324. The parts of the pixel electrode 342 are arranged in an alternating pattern with the portions of the common electrode 314. Each portion of the common electrode 314 and each part of the pixel electrode 342 includes a transparent conductive pattern TP and an opaque conductive pattern OP that are sequentially layered. The opaque conductive pattern OP has a more narrow width than the transparent conductive pattern TP. A central line of the opaque conductive pattern OP is aligned with a central line of the transparent conductive pattern TP.

In an IPS mode LCD device including the array substrate according to the third embodiment, the brightness and the contrast ratio of the device are increased because the edges of the common and pixel electrodes are utilized and the leakage of light is prevented in central areas of the electrodes.

Figure 11:
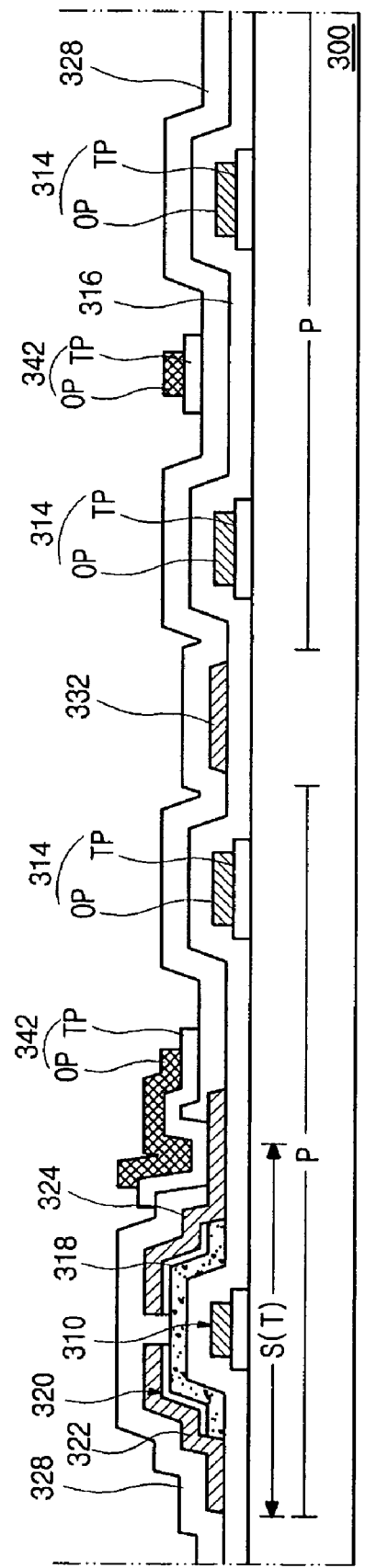
FIG. 11 is a cross-sectional view along the line XI-XI of FIG. 10.

FIG. 11 is a cross-sectional view along the line XI-XI of FIG. 10. In FIG. 11, switching regions S and pixel regions P are defined on a substrate 300. Each pixel region P includes one switching region S. A gate line (not shown) is formed along a first side of the pixel region P, and a data line 332 is formed along a second side of the pixel region P. The gate line and the data line cross each other. A common line (not shown) is formed along a third side of the pixel region P substantially parallel to the first side of the pixel region. The common line is disposed between adjacent gate lines.

A thin film transistor T is formed in the switching region S. The thin film transistor T includes a gate electrode 310, a gate insulating layer 316, an active layer 318, an ohmic contact layer 320, a source electrode 322, and a drain electrode 324. The gate insulating layer 316 covers the gate electrode 310. The active layer 318 and the ohmic contact layer 320 are sequentially disposed on the gate insulating layer 316 over the gate electrode 310. The source and drain electrodes 322 and 324 are spaced apart from each other on the ohmic contact layer 320.

A common electrode 314 is formed in each pixel region P on the substrate 300. The common electrode 314 may be formed of the same material and on the same layer as the gate electrode 310. The common electrode 314 includes a plurality of portions connected to the common line (not shown).

A passivation layer 328 covers the thin film transistor T and the data line 332. A pixel electrode 342 is formed in each pixel region P on the passivation layer 328. The pixel electrode 342 contacts the drain electrode 324 and includes a plurality of parts. The parts of the pixel electrode 342 alternate with the portions of the common electrode 314.

Each portion of the common electrode 314 and each part of the pixel electrode 342 include a transparent conductive pattern TP and an opaque conductive pattern OP which are sequentially layered. The opaque conductive pattern OP has a more narrow width than the transparent conductive pattern TP. A central line of the opaque conductive pattern OP is aligned with a central line of the transparent conductive pattern TP.

The array substrate according to the third embodiment may be manufactured through the same mask processes as the first embodiment or the second embodiment except forming the pixel electrode. In the third embodiment, the pixel electrode is formed by the same method for forming the common electrode.

In the first, second and third embodiments, the pixel electrode and the common electrode have a rod shape substantially parallel to the data line. The pixel electrode and the common electrode may have other shapes.

In a fourth embodiment, the pixel electrode and the common electrode may have a zigzag shape.

Figure 12:
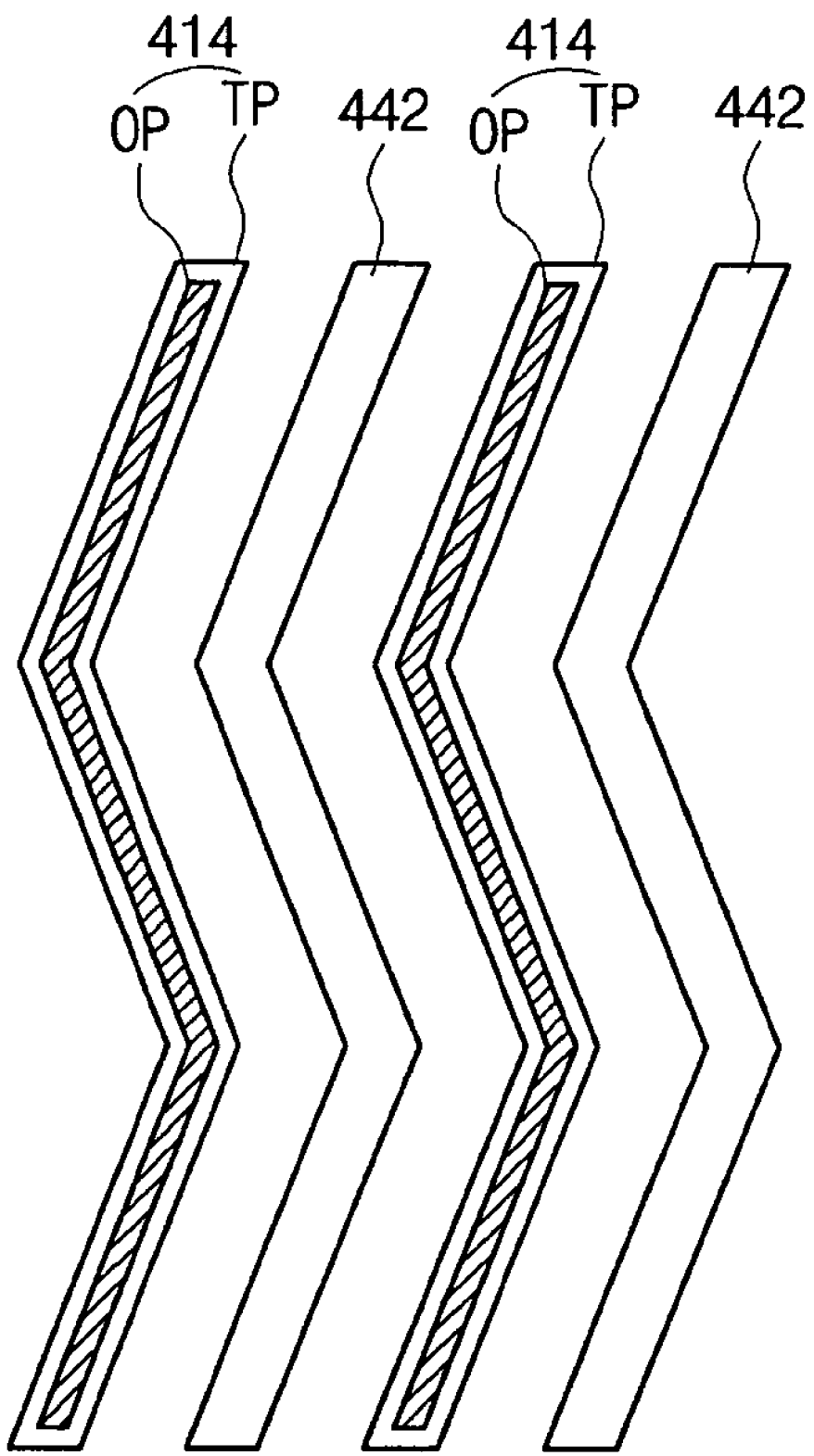
FIG. 12 is a schematic view of showing a pixel electrode and a common electrode for an IPS mode LCD device according to a fourth embodiment.

FIG. 12 is a schematic view of showing a pixel electrode and a common electrode for an IPS mode LCD device according to a fourth embodiment. In FIG. 12, a common electrode 414 includes a plurality of portions, and a pixel electrode 442 includes a plurality of parts. The parts of the pixel electrode 442 alternate with the portions of the common electrode 414. Each portion of the common electrode 414 includes a transparent conductive pattern TP and an opaque conductive pattern OP. The opaque conductive pattern OP has a more narrow width than the transparent conductive pattern TP. The pixel electrode 442 is formed of a transparent conductive material. The pixel electrode 442 may include a transparent conductive pattern and an opaque conductive pattern in the same way as the common electrode 414.

The parts of the pixel electrode 442 and the portions of the common electrode 414 are bent and have a substantially zigzag shape. The viewing angles are improved in a left-right direction or a diagonal direction with respect to the device.

Figure 13:
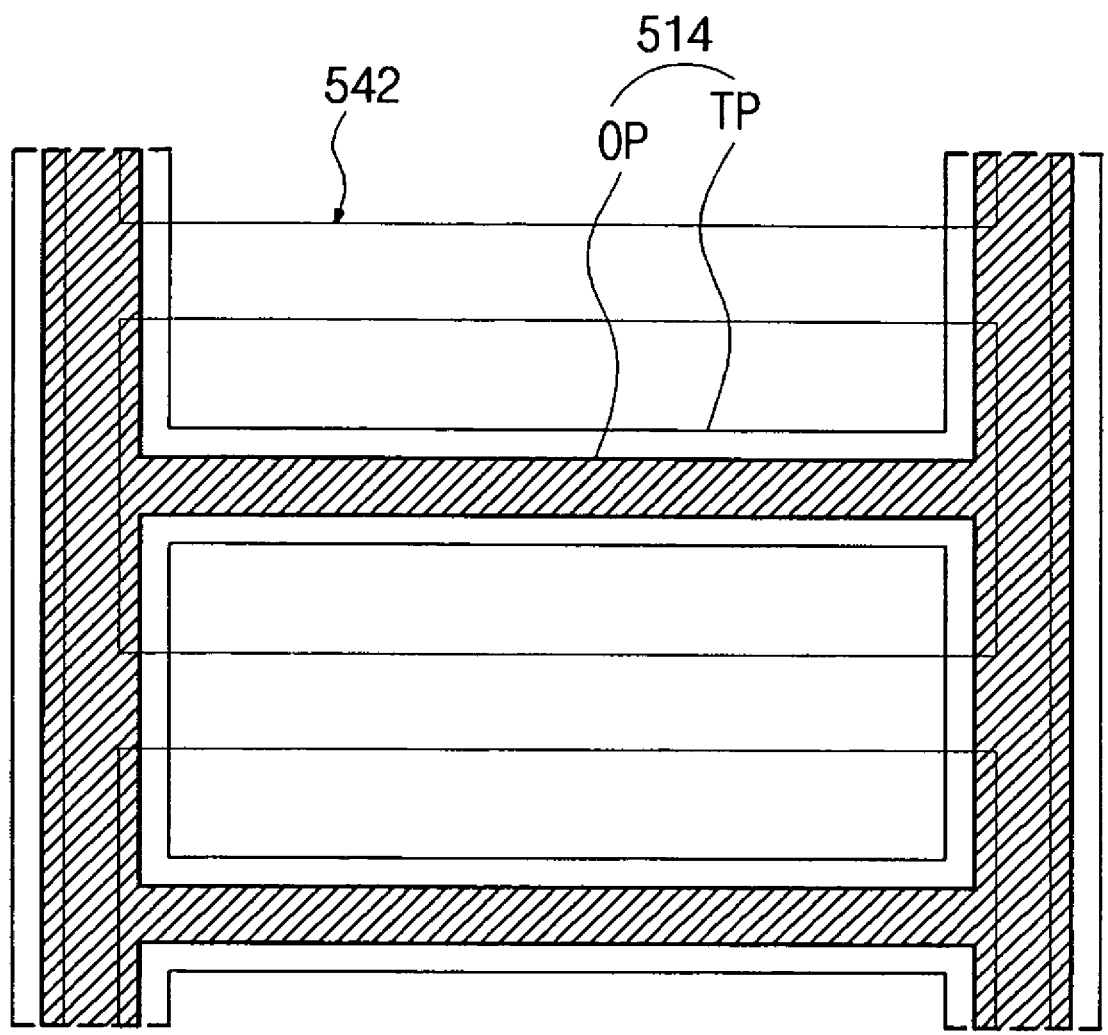
FIG. 13 is a schematic view of showing a pixel electrode and a common electrode for an IPS mode LCD device according to a fifth embodiment.

FIG. 13 is a schematic view of a pixel electrode and a common electrode for an IPS mode LCD device according to a fifth embodiment. In FIG. 13, a common electrode 514 includes a plurality of portions, and a pixel electrode 542 includes a plurality of parts. The parts of the pixel electrode 542 are arranged in an alternating pattern with the portions of the common electrode 514. Each portion of the common electrode 514 includes a transparent conductive pattern TP and an opaque conductive pattern OP. The opaque conductive pattern OP has a more narrow width than the transparent conductive pattern TP. The pixel electrode 542 is formed of a transparent conductive material. The pixel electrode 542 may include a transparent conductive pattern and an opaque conductive pattern in the same way as the common electrode 514.

The portions of the common electrode 514 and the parts of the pixel electrode 542 are disposed along a horizontal direction in the context of the figure. Although not shown in the figure, the portions of the common electrode 514 and the parts of the pixel electrode 542 are substantially parallel to a gate line. The viewing angles are improved in an up-down direction or a diagonal direction with respect to the device.

In the present invention, the common electrode and the pixel electrode include a transparent conductive pattern. Edges of the common electrode and the pixel electrode are utilized as the aperture area, and thus the brightness of the device is increased. In addition, at least one of the common electrode and the pixel electrode further includes an opaque conductive pattern having a more narrow width than the transparent conductive pattern. The leakage of light is prevented in a central area of the electrode, and the contrast ratio is improved.

The array substrate according to the present invention may be manufactured using a four (4) mask process. As a result, manufacturing time and costs are reduced, and production yield is increased.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, comprising:
    a substrate;
    a gate line along a first direction on the substrate;
    a data line along a second direction and crossing the gate line to define a pixel region;
    a thin film transistor connected to the gate and data lines;
    a pixel electrode in the pixel region and connected to the thin film transistor; and
    a common electrode in the pixel region and arranged in an alternating pattern with the pixel electrode,
    wherein each of the pixel electrode and the common electrode includes a transparent conductive pattern, and one of the pixel electrode and the common electrode further includes an opaque conductive pattern having a more narrow width than the transparent conductive pattern.

2. The array substrate according to claim 1, wherein the width of the opaque conductive pattern is more narrow than a width of the transparent conductive pattern by about 1 μm to about 4 μm.

3. The array substrate according to claim 1, wherein the other of the pixel electrode and the common electrode further includes an opaque conductive pattern having a more narrow width than the transparent conductive pattern.

4. The array substrate according to claim 1, wherein the pixel electrode includes a plurality of parts along the first direction, and the common electrode includes a plurality of portions along the first direction.

5. The array substrate according to claim 1, wherein the pixel electrode includes a plurality of parts along the second direction, and the common electrode includes a plurality of portions along the second direction.

6. The array substrate according to claim 1, wherein the pixel electrode includes a plurality of parts, the common electrode includes a plurality of portions, and each part and each portion have a substantially zigzag shape.

7. The array substrate according to claim 1, further comprising a common line along the first direction, wherein the common line is connected to the common electrode.

8. The array substrate according to claim 7, wherein the common line includes a transparent conductive pattern and an opaque conductive pattern having a more narrow width than the transparent conductive pattern.

9. The array substrate according to claim 1, wherein thin film transistor includes a gate electrode connected to the gate line, an active layer over the gate electrode, an ohmic contact layer on the active layer, a source electrode on the ohmic contact layer and connected to the data line, and a drain electrode on the ohmic contact layer and spaced apart from the source electrode.

10. A method of manufacturing an array substrate for an in-plane switching mode liquid crystal display device, comprising:
    forming a gate line along a first direction on a substrate;
    forming a data line along a second direction, the data line crossing the gate line to define a pixel region;
    forming a thin film transistor connected to the gate and data lines;
    forming a pixel electrode in the pixel region and connected to the thin film transistor; and
    forming a common electrode in the pixel region and alternating with the pixel electrode,
    wherein each of the pixel electrode and the common electrode is formed to include a transparent conductive pattern, and one of the pixel electrode and the common electrode further includes an opaque conductive pattern having a more narrow width than the transparent conductive pattern.

11. The method according to claim 10, wherein the other of forming the pixel electrode and forming the common electrode further includes forming an opaque conductive pattern that has a more narrow width than the transparent conductive pattern.

12. The method according to claim 10, wherein the pixel electrode includes a plurality of parts along the first direction, and the common electrode includes a plurality of portions along the first direction.

13. The method according to claim 10, wherein the pixel electrode includes a plurality of parts along the second direction, and the common electrode includes a plurality of portions along the second direction.

14. The method according to claim 10, wherein the pixel electrode includes a plurality of parts, the common electrode includes a plurality of portions, and each part and each portion has a substantially zigzag shape.

15. The method according to claim 13, further comprising forming a common line along the first direction, wherein the common line is connected to the common electrode.

16. The method according to claim 15, wherein forming the common line includes forming a transparent conductive pattern and forming an opaque conductive pattern that has a more narrow width than the transparent conductive pattern.

17. A method of manufacturing an array substrate for an in-plane switching mode liquid crystal display device, comprising:
    forming a gate line, a gate electrode and a common electrode on a substrate including a pixel region, the gate line extending along a first direction, the gate electrode connected to the gate line, the common electrode disposed in the pixel region;
    forming an active layer and an ohmic contact layer over the gate electrode;
    forming a data line, a source electrode and a drain electrode on the ohmic contact layer, the data line extending along a second direction and crossing the gate line to define the pixel region, the source electrode connected to the data line, and the drain electrode spaced apart from the source electrode;
    forming a passivation layer covering the data line, the source electrode and the drain electrode, the passivation layer including a contact hole exposing the drain electrode; and
    forming a pixel electrode in the pixel region on the passivation layer and connected to the drain electrode, the pixel electrode being arranged in an alternating pattern with the common electrode,
    wherein forming the pixel electrode and forming the gate line, the gate electrode and the common electrode include forming a transparent conductive pattern, and one of forming the pixel electrode and forming the gate line, the gate electrode and the common electrode further includes forming an opaque conductive pattern that has a more narrow width than the transparent conductive pattern.

18. The method according to claim 17, wherein the other of forming the pixel electrode and forming the gate line, the gate electrode and the common electrode further includes forming an opaque conductive pattern that has a more narrow width than the transparent conductive pattern.

19. The method according to claim 17, wherein forming the gate line, the gate electrode and the common electrode includes:
    sequentially forming a transparent conductive layer and an opaque conductive layer on the substrate;
    forming a photoresist pattern on the opaque conductive layer;
    removing the opaque conductive layer and the transparent conductive layer using the photoresist pattern as an etching mask to thereby form the opaque conductive pattern and the transparent conductive pattern;
    partially removing the photoresist pattern to expose the opaque conductive pattern;
    removing the exposed opaque conductive pattern using the photoresist pattern partially removed; and
    removing the photoresist pattern partially removed.

20. The method according to claim 17, further comprising forming a common line along the first direction, wherein the common line is connected to the common electrode.

21. The method according to claim 20, wherein forming the common line includes forming a transparent conductive pattern and forming an opaque conductive pattern that has a more narrow width than the transparent conductive pattern.

22. The method according to claim 17, wherein the pixel electrode includes a plurality of parts along the first direction, and the common electrode includes a plurality of portions along the first direction.

23. The method according to claim 17, wherein the pixel electrode includes a plurality of parts along the second direction, and the common electrode includes a plurality of portions along the second direction.

24. The method according to claim 17, wherein the pixel electrode includes a plurality of parts, the common electrode includes a plurality of portions, and each part and each portion have a substantially zigzag shape.

25. The method according to claim 17, wherein forming the active layer and the ohmic contact layer is performed using a same mask process as forming the data line, the source electrode and the drain electrode.

26. The method according to claim 25, wherein the same mask process includes:
    forming an intrinsic amorphous silicon layer, an impurity-doped amorphous silicon layer and a conductive metallic layer substantially on an entire surface of the substrate including the gate line, the gate electrode and the common electrode;
    forming a photoresist layer on the conductive metallic layer;
    disposing a mask over the photoresist layer;
    exposing the photoresist layer to light through the mask;
    forming a photoresist pattern by developing the photoresist pattern exposed to light, the photoresist pattern including a first part corresponding to the source and drain electrodes and the data line and a second part corresponding to the active layer, wherein the first part is thicker than the second part;
    removing the conductive metallic layer, the impurity-doped amorphous silicon layer and the intrinsic amorphous silicon layer using the photoresist pattern as an etching mask to form a metallic pattern, the ohmic contact layer, the active layer and the data line;
    removing the second part of the photoresist pattern to expose the metallic pattern;
    selectively removing the metallic pattern and the ohmic contact layer using the first part of the photoresist pattern as an etching mask; and
    removing the first part of the photoresist pattern.

* * * * *